(12) United States Patent
Joshi et al.

(10) Patent No.: US 8,773,431 B2
(45) Date of Patent: Jul. 8, 2014

(54) METHODS AND APPARATUS FOR GENERATING AN N-SIDED PATCH BY SKETCHING ON A THREE-DIMENSIONAL REFERENCE SURFACE

(75) Inventors: Pushkar P. Joshi, Fremont, CA (US); Nathan A. Carr, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 606 days.

(21) Appl. No.: 12/766,479

(22) Filed: Apr. 23, 2010

(65) Prior Publication Data

US 2013/0120376 A1   May 16, 2013

Related U.S. Application Data

(60) Provisional application No. 61/172,623, filed on Apr. 24, 2009.

(51) Int. Cl.
*G06T 17/00* (2006.01)
(52) U.S. Cl.
USPC ............ 345/420; 345/442; 345/581; 345/643
(58) Field of Classification Search
USPC ............................................ 700/98; 345/442
See application file for complete search history.

(56) References Cited

U.S. PATENT DOCUMENTS

| | | | |
|---|---|---|---|
| 5,999,188 A * | 12/1999 | Kumar et al. | 345/423 |
| 6,369,815 B1 | 4/2002 | Celniker et al. | |
| 6,441,823 B1 | 8/2002 | Ananya | |
| 6,639,592 B1 * | 10/2003 | Dayanand et al. | 345/419 |
| 7,239,313 B2 | 7/2007 | Liepa | |
| 7,324,105 B1 | 1/2008 | Moreton et al. | |
| 8,207,990 B1 * | 6/2012 | DeSimone et al. | 345/630 |
| 8,334,868 B2 | 12/2012 | Carr et al. | |
| 8,379,018 B2 | 2/2013 | Carr et al. | |
| 8,610,720 B2 | 12/2013 | Joshi et al. | |
| 8,711,150 B2 | 4/2014 | Joshi | |
| 2002/0095236 A1 | 7/2002 | Dundorf | |
| 2005/0128211 A1 * | 6/2005 | Berger et al. | 345/582 |
| 2005/0140670 A1 | 6/2005 | Wu et al. | |
| 2005/0237325 A1 | 10/2005 | Motter et al. | |
| 2008/0036773 A1 | 2/2008 | Bae | |

(Continued)

OTHER PUBLICATIONS

Mark Meyer, Mathieu Desbrun, Peter Schroeder, and Alan Barr, Discrete Differential-Geometry Operators for Triangulated 2-Manifolds, In Proceedings of Visualization and Mathematics, 2002.

(Continued)

*Primary Examiner* — Phi Hoang
(74) *Attorney, Agent, or Firm* — Wolfe-SBMC

(57) ABSTRACT

Methods and apparatus for generating an n-sided patch by sketching on a three-dimensional reference surface. A user draws a closed curve on a 3D surface; the drawn outline is taken as a boundary for an N-sided patch. If the user does not close the curve, the system may automatically close the curve, as a closed outer boundary curve may be required to produce an N-sided patch. The boundary conditions, the positions, and the surface normals at the boundary are inferred automatically from the 3D surface that the user has drawn the curve on. In addition, boundary curves for the same patch may be drawn on different 3D shapes; multiple 3D shapes may be used as the template or canvas on which the user draws curves from which a patch is to be generated.

20 Claims, 26 Drawing Sheets

(56) References Cited

U.S. PATENT DOCUMENTS

| | | | |
|---|---|---|---|
| 2009/0231337 A1 | 9/2009 | Carr | |
| 2009/0231338 A1 | 9/2009 | Carr | |
| 2009/0248184 A1* | 10/2009 | Steingart et al. | 700/98 |
| 2009/0284550 A1 | 11/2009 | Shimada et al. | |
| 2010/0054625 A1* | 3/2010 | Wang | 382/276 |
| 2012/0098821 A1 | 4/2012 | Sheng | |
| 2013/0120382 A1 | 5/2013 | Joshi | |
| 2013/0120383 A1 | 5/2013 | Joshi | |

OTHER PUBLICATIONS

Mathieu Desbrun, Mark Meyer, Peter Schroeder Alan H. Barr, Discrete Differential-Geometry Operators in nD, Jul. 22, 2000.

Botsch M., Bommes D., Kobbelt L.: Efficient linear system solvers for mesh processing. In Mathematics of Surfaces XI. 2005, pp. 62-83.

Botsch M., Kobbelt L.: An intuitive framework for real-time freeform modeling. ACM Trans. Graph. 23, 3 (2004), 630-634.

Igarashi T., Matsuoka S., Tanaka H.: Teddy: A sketching interface for 3d freeform design. In SIGGRAPH (1999), pp. 409-416.

Shigeru Owada, Frank Nielsen, Kazuo Nakazawa, Takeo Igarashi: A Sketching Interface for Modeling the Internal Structures of 3D Shapes, International Conference on Computer Graphics and Interactive Techniques, ACM SIGGRAPH 2007.

Karpenko O. A., Hughes J. F.: Smoothsketch: 3d free-form shapes from complex sketches. ACM Transactions on Graphics 25/3 (2006), 589-598.

Levinski K., Sourin A.: Interactive function-based shape modelling. Computers & Graphics 31,1 (2007), 66-76.

Liu Y.-J., Tang K., Joneja A.: Sketch-based free-form shape modelling with a fast and stable numerical engine. Computers & Graphics 29,5 (2005), 771-786.

Nealen A., Igarashi T., Sorkine O., Alexa M.: Fibermesh: designing freeform surfaces with 3d curves. ACM Trans. Graph. 26,3 (2007), 41.

Pinkall U., Polthier K.: Computing discrete minimal surfaces and their conjugates. vol. 2, pp. 15-36.

Prasad M., Zisserman A., Fitzgibbon A. W.: "Fast and Controllable 3D Modelling From Silhouettes" in Eurographics, Short Papers (Sep. 2005), pp. 9-12.

Shewchuk J. R.: Triangle: "Engineering a 2D Quality Mesh Generator and Delaunay Triangulator" In Applied Computational Geometry: Towards Geometric Engineering, Lin M. C., Manocha D., (Eds.), vol. 1148 of Lecture Notes in Computer Science. Springer-Verlag, May 1996, pp. 203-222. From the First ACM Workshop on Applied Computational Geometry.

Schneider R., Kobbelt L.: "Geometric Fairing of Irregular Meshes for Free-form Surface Design" Computer Aided Geometric Design 18,4 (2001), 359-379.

Sourin A.: "Functionally Based Virtual Computer Art" in I3D '01: Proceedings of the 2001 symposium on Interactive 3D graphics (New York, NY, USA, 2001), ACM, pp. 77-84.

Schmidt R., Wyvill B., Sousa M., Jorge J.: "Shapeshop: Sketch-based Solid Modeling with Blobtrees", 2005.

Zeleznik R. C., Herndon K. P., Hughes J. F.: Sketch: "An interface for Sketching 3D Scenes" In SIGGRAPH 96 Conference Proceedings (1996), Rushmeier H., (Ed.), Addison Wesley, pp. 163-170.

Bae S.-H., Balakrishnan R., Singh K.: Ilovesketch: as-natural-as-possible sketching system for creating 3d curve models. In UIST '08: Proceedings of the 21st annual ACM symposium on User interface software and technology (New York, NY, USA, 2008), ACM, pp. 151-160.

Biermann H., Levin A., Zorin D.: Piecewise smooth subdivision surfaces with normal control. In SIGGRAPH '00: Proceedings of the 27th annual conference on Computer graphics and interactive techniques (New York, NY, USA, 2000), ACM Press/Addison-Wesley Publishing Co., pp. 113-120.

Demmel J. W., Eisenstat S. C., Gilbert J. R., Li X. S., Liu J. W. H.: A supernodal approach to sparse partial pivoting. SIAM J. Matrix Analysis and Applications 20, 3 (1999), 720-755.

Gao, K., Park, H., Rockwood, A..: Feature based styling. whitepaper, 2009.

Gingold Y., Zorin D.: Shading-based surface editing. ACM Trans. Graph. 27, 3 (2008), 1-9.

Levin A.: Interpolating nets of curves by smooth subdivision surfaces. In SIGGRAPH '99: Proceedings of the 26th annual conference on Computer graphics and interactive techniques (New York, NY, USA, 1999), ACM Press/ Addison-Wesley Publishing Co., pp. 57-64.

Loop C.: Generalized B-spline Surfaces of Arbitrary Topological Type. PhD thesis, University of Washington, 1992.

Pinkall U., Polthier K.: Computing discrete minimal surfaces and their conjugates. Experimental Mathematics 2, 1 (1993), 15-36.

Ugail H., Bloor M. I. G., Wilson M. J.: Techniques for interactive design using the pde method. ACM Trans. Graph. 18,2 (1999), 195-212.

Bae, Seok-Hyung et al., "ILoveSketch: As-Natural-As-Possible Sketching System for Creating 3D Curve Models", *In UIST '08: Proceedings of the 21st annual ACM symposium on User interface software and technology. New York, NY, USA, 2008. ACM*, (Oct. 19, 2008), pp. 151-160.

Biermann, Henning et al., "Piecewise Smooth Subdivision Surfaces with Normal Control", *SIGGRAPH 2000, New Orleans, LA*, Available at <mrl.nyu.edu/~dzorin/papers/biermann2000pss.pdf >, (Jul. 2000), pp. 113-120.

Demmel, James W., et al., "A Supernodal Approach to Sparse Partial Pivoting", *SIAM J. Matrix Analysis and Applications*, vol. 20, No. 3, (1999), pp. 720-755.

Gao, Kun et al., "Feature Based Styling", *Whitepaper*, (2009), 7 pages.

Gingold, Yotam et al., "Shading-Based Surface Editing", *ACM Transactions on Graphics*, vol. 27, No. 3, (2008), 9 pages.

Levin, Adi "Interpolating Nets of Curves by Smooth Subdivision Surfaces", *SIGGRAPH 99, Los Angeles, CA*, ISBN: 0-201-48560,(1999), pp. 57-64.

Loop, Charles T., "Generalized B-Spline Surfaces of Arbitrary Topological Type", *PhD thesis, University of Washington*, (1992), 118 pages.

Ugail, Hassan et al., "Techniques for Interactive Design Using the PDE Method", *ACM Transactions on Graphics*, vol. 18, No. 2, (1999), 18 pages.

"Non-Final Office Action", U.S. Appl. No. 12/276,105, (May 4, 2012), 17 pages.

"Non-Final Office Action", U.S. Appl. No. 12/276,106, (Jun. 4, 2012), 22 pages.

"Non-Final Office Action", U.S. Appl. No. 12/766,489, (Dec. 6, 2012), 8 pages.

"Non-Final Office Action", U.S. Appl. No. 12/766,495, (Mar. 1, 2013), 9 pages.

"Notice of Allowance", U.S. Appl. No. 12/276,105, (Aug. 15, 2012), 5 pages.

"Notice of Allowance", U.S. Appl. No. 12/276,106, (Oct. 12, 2012), 6 pages.

Botsch, et al., "An Intuitive Framework for Real-Time Freeform Modeling", *ACM Trans. Graph.* 23, 3 (2004), 630-634., (2004), 5 pages.

Botsch, et al., "Efficient Linear System Solvers for Mesh Processing", *Mathematics of Surfaces XI*. 2005, pp. 62-83., (2005), 22 pages.

Desbrun, Mathieu et al., "Discrete Differential-Geometry Operators in nD", *Caltech, USC*, (Jul. 22, 2000), 26 pages.

Igarashi, Takeo et al., "Teddy: A Sketching Interface for 3D Freeform Design", *In SIGGRAPH '99, Los Angeles, CA, USA*, (1999), pp. 409-416.

Karpenko, Olga A., et al., "Smoothsketch: 3D Free-Form Shapes from Complex Sketches", *ACM Transactions on Graphics 25/3*, (2006), pp. 589-598.

Levinski, et al., "Interactive function-based shape modelling", *Computers & Graphics 31*, 1 (2007), 66-76., (2007), 11 pages.

Liu, et al., "Sketch-based free-form shape modelling with a fast and stable numerical engine", *Computers & Graphics 29*, 5 (2005), 771-786., (2005), 16 pages.

Nealen, Andrew et al., "Fibermesh: Designing Freeform Surfaces with 3D Curves", *ACM Transactions Graphics 26*, 3, 41, (2007), 8 pages.

(56) References Cited

OTHER PUBLICATIONS

Owada, et al., "A Sketching Interface for Modeling the Internal Structures of 3D Shapes", *International Conference on Computer Grpahics and Interactive Techniques, ACM SIGGRAPH 2007.*, (2007), 9 pages.

Pinkall, Ulrich et al., "Computing Discrete Minimal Surfaces and Their Conjugates", *Experimental Mathematics*, 2, (Feb. 1993), 33 pages.

Prasad, et al., "Fast and Controllable 3D Modelling from Silhouettes", *Eurographics Short Papers* (Sep. 2005), pp. 9-12., (Sep. 2005), 4 Pages.

Schmidt, et al., "ShapeShop: Sketch-Based Solid Modeling with BlobTrees", Schmidt R., Wyvill B., Sousa M., Jorge J.: *Shapeshop: Sketch-based Solid Modeling with Blobtrees*", 2005., (2005), 10 pages.

Schneider, et al., "Geometric Fairing of Irregular Meshes for Free-Form Surface Design", *Computer Aided Geometric Design 18*, 4 (2001), 359-379., (2001), 25 pages.

Shewchuk, Jonathan R., "Triangle: Engineering a 2D Quality Mesh Generator and Delaunay Triangulator", *Applied Computational Geometry: Towards Geometric Engineering, Lin M. C., Manocha D., (Eds.), val. 1148 of Lecture Notes in Computer Science. Springer-Verlag*, May 1996, pp. 203-222. From the First ACM Workshop on Applied Computational Geometry., (May 1996), 10 pages.

Sourin, Alexei "Functionally Based Virutal Computer Art", *I3D '01: Proceedings of the 2001 synposium on Interactive 3D graphics* (New York, NY, USA, 2001 ), *ACM*, pp. 77-84., (2001), 9 pages.

Zeleznik, et al., "SKETCH: An Interface for Sketching 3D Scenes", *SIGGRAPH 96 Conference Proceedings* (1996) Rushmeier H., (Ed.), Addison Wesley, pp. 163-170., (1996), 6 pages.

"Final Office Action", U.S. Appl. No. 12/766,489, Jun. 6, 2013, 10 pages.

"Notice of Allowance", U.S. Appl. No. 12/766,489, Aug. 1, 2013, 8 pages.

"Corrected Notice of Allowance", U.S. Appl. No. 12/766,489, (Sep. 18, 2013), 2 pages.

"Corrected Notice of Allowance", U.S. Appl. No. 12/766,489, (Nov. 21, 2013), 2 pages.

"Final Office Action", U.S. Appl. No. 12/766,495, (Sep. 25, 2013),11 pages.

"Notice of Allowance", U.S. Appl. No. 12/766,495, (Nov. 18, 2013), 8 pages.

"Corrected Notice of Allowance", U.S. Appl. No. 12/766,495, Feb. 13, 2014, 2 pages.

* cited by examiner

Figure 1
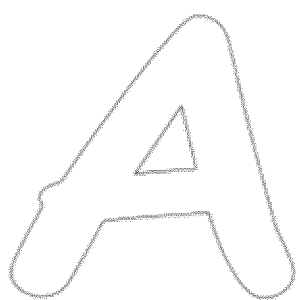 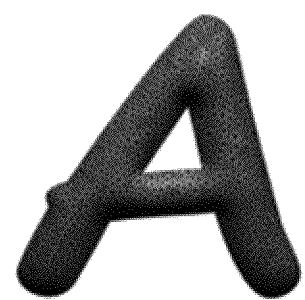
Figure 2a   Figure 2b   Figure 2c

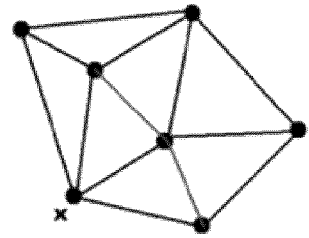 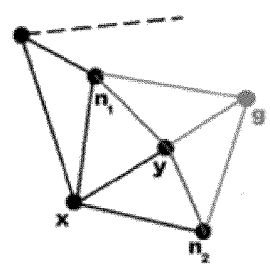 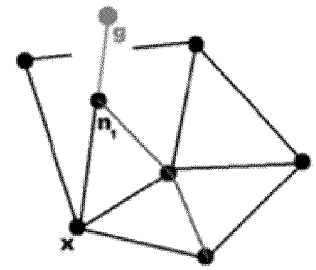
Figure 20a       Figure 20b       Figure 20c
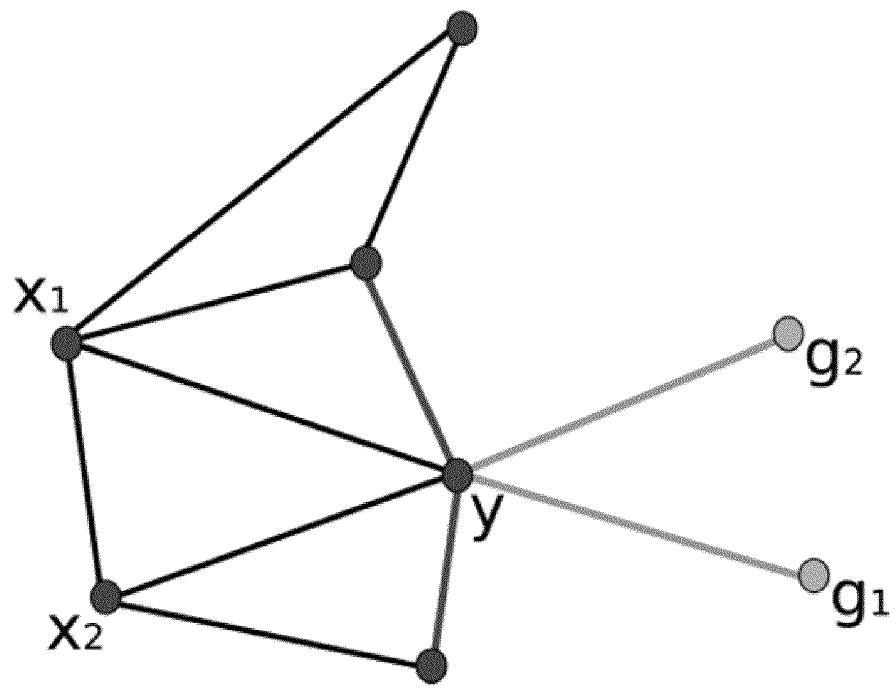
Figure 21

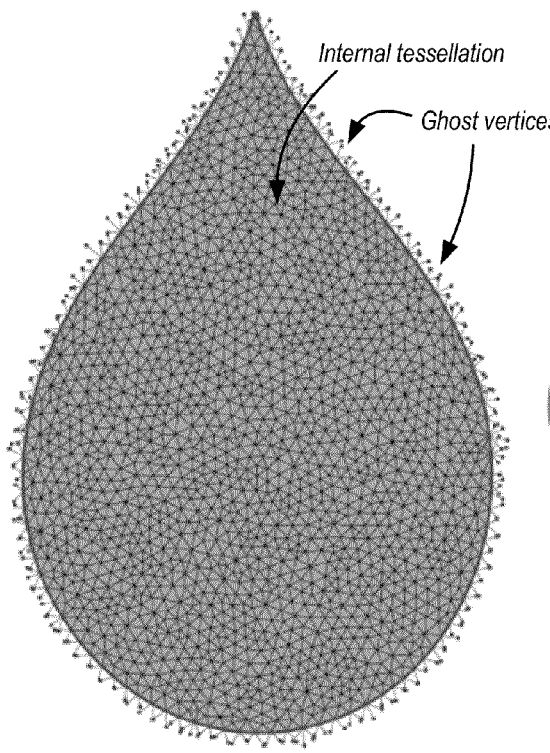
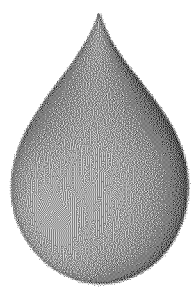
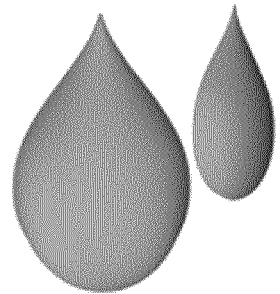
*Figure 24a*
*Figure 24b*
*Figure 24c*
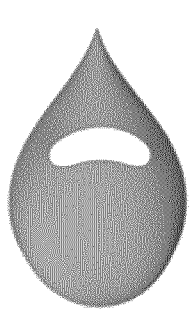
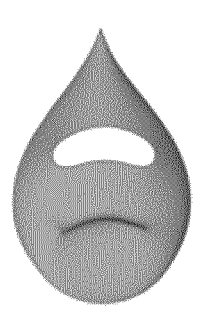
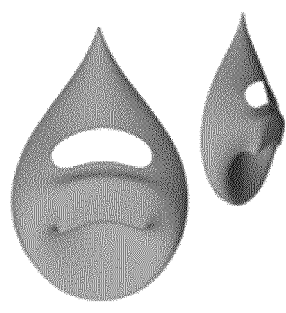
*Figure 24d*
*Figure 24e*
*Figure 24f*

# METHODS AND APPARATUS FOR GENERATING AN N-SIDED PATCH BY SKETCHING ON A THREE-DIMENSIONAL REFERENCE SURFACE

PRIORITY INFORMATION

This application claims benefit of priority of U.S. Provisional Application Ser. No. 61/172,623 entitled "Methods and Apparatus for Modeling 3D Surfaces From Curves" filed Apr. 24, 2009, the content of which is incorporated by reference herein in its entirety.

BACKGROUND

Description of the Related Art

Modeling three-dimensional (3D) surfaces on a computer remains to be a challenging problem for users such as artists. Over the past number of decades, much work has gone into developing various technologies for representing 3D surfaces in the computer. These include polygon meshes, parametric (e.g. Non-Uniform Rational B-Spline, or NURBS), subdivision surfaces, as well as implicit functions, and volumetric representations. The choice of surface representation often directly impacts on the modeling process and requires the user to be familiar with the underlying representation. Polygon meshes, for example, cannot accurately represent curved surfaces, and produce large numbers of control vertices that the user must manipulate. Parametric representations such as NURBS provide a sparser set of control vertices while providing smooth continuous surfaces to be created. Unfortunately, parametric patches come with their own set of constraints. To model effectively using NURBS, the user must typically represent their art as a set of quadrilateral based patches. Iso-Parameter lines should follow the principle curvatures of the surface. Irregularities occur when more than four patches share a vertex. To help alleviate some of these issues many modelers allow N-sided patches, where N is typically small (<16). Support for seamless t-junctions has also been added to parametric patch systems to aid in patch density control for modeling from course to finer features.

Some modeling packages have adopted subdivision surfaces as an alternative to parametric patches. Using this representation, the user forms a control cage around the art that the surface either interpolates or approximates. Smooth and sharp features are supported by tagging the edges and vertices of this cage. More recently normal control has been added to allow greater surface control without adding more control cage vertices. One challenge with a subdivision approach is developing the initial polygon mesh control cage for the desired art.

In computer-aided image design, sketch based interfaces have become popular as a method for quick three-dimensional (3D) shape modeling. With an ever-increasing set of modeling features, the powerful 3D sketching interface can construct shapes that range from rectilinear, industrial objects to smooth, organic shapes. Usually, the application of these shape sketching interfaces is 3D shape design. The two-dimensional (2D) curves drawn by the user are simply a means to get to the end result: the 3D shape.

Currently, there are a few 3D shape modeling tools in readily available 2D artistic design software. A commonly used modeling primitive is shape extrusion, where a closed 2D curve is swept along a straight line (or a curve) to create prismatic shapes. Similar to extrusion is curve rotation, where a curve is rotated along an axis to construct rotationally symmetrical shapes. Another commonly used primitive is beveling, where the input 2D curve is offset and raised to provide an appearance of a 3D shape that has thickness and sharp edges. These 3D modeling primitives are limited in the type of surface features they can support. For example, no conventional image design application supports adding sharp creases in the interior of a beveled image.

A current effort of research is to improve the range of surface edits possible in a 2D design tool. Research areas include virtual embossing and a more general, function-based surface modeling system. Both use an implicit surface representation to model their surfaces (the surface is interactively polygonized for rendering purposes).

SUMMARY

Various embodiments of methods and apparatus for modeling three-dimensional (3D) surfaces from curves are described. Sketch-based modeling refers to the modeling of 3D shapes from sketches. The user has high-level, intuitive control over the surface and does not have to directly manipulate the surface vertices. Two components that together may form a geometry framework for sketch-based modeling are presented. An arbitrary-sided variational surface patch that is useful for interpolating a network of sketched curves is described. The input to the patch representation is a closed 3D space curve with position and normal information at all points along the curve. The underlying system treats the input curve as the boundary and automatically generates the surface that interpolates the boundary conditions with $G^1$ continuity. The surface quality is not affected by concavities or by the number of sides in the patch boundary. Additionally, each patch can have an arbitrary number of holes and internal constraint curves that the surface interpolates with $G^1$ or $G^0$ continuity. The patches described herein can represent most or all of the shapes that users would expect to create with a sketch-based interface.

In addition, user interface workflows that, given the patch representation, simplify the construction of 3D models from sketches are described. The patch representation may, for example, be generated according to the variational N-sided patch technique described herein. However, the workflows may also be applied to patches implemented using other techniques, and/or may be implemented in systems that implement other techniques than the variational N-sided patch technique. Embodiments may provide a workflow for generating patches by sketching on a 3D reference surface; the user draws a closed curve on a 3D surface; the drawn outline is taken as a boundary for an N-sided patch. If the user does not close the curve, the system may automatically close the curve, as a closed outer boundary curve may be required to produce an N-sided patch. The 3D surface being drawn on may be any 3D surface; it does not have to be a surface created using the N-sided patch technology. The boundary conditions, the positions, and the surface normals at the boundary are inferred automatically from the 3D surface that the user has drawn the curve on. As the user draws on the curved canvas, the position and the surface normals at some or all points on the curve are determined from the 3D surface and stored by the system. The stored information may then be passed to the variational N-sided patch technology to generate the patch.

In some embodiments, boundary curves for the same patch may be drawn on different shapes. In these embodiments, multiple 3D shapes may be used as the template or canvas on which the user draws curves from which a patch is to be generated. The user may first draw a curve or portion of a curve on one 3D shape. The 3D object may be replaced with a different 3D shape, and the user may continue to draw the curve on the surface of the new 3D shape. At each point that the user draws on the canvas, the surface position, tangent, and normal are recorded. The canvas can be replaced with a different shape, and the user can continue drawing.

The methods and workflows described herein are not specific to the very quick, informal sketching gestures prevalent in most sketch-based modelers. Curves precisely laid down on a 2D image as a "sketch" in the context of 3D modeling are also considered.

Embodiments may thus provide a variational N-sided patch technique and one or more workflows that together form a framework for constructing surface models from sketches. Embodiments of a variational N-sided patch technique may take a closed 2D curve as input and produce a smooth surface that interpolates the curve. The patch can have an arbitrary number of sides, holes, or internal constraints. In addition, embodiments may provide intuitive parameters for controlling the shape of the surface near constraint curves. Given the patch representation, workflows are provided that simplify the construction of complex 3D models from sketches. Embodiments may leverage the ability, for example, to generate 3D curves as input for new patches, to break a single patch into multiple smaller patches, and to connect adjacent patches with tangent plane continuity.

BRIEF DESCRIPTION OF THE DRAWINGS

FIG. 1 illustrates examples of results of surface inflation using an embodiment of the surface inflation tool.

FIGS. 2a through 2c graphically illustrate workflow in a surface inflation tool according to one embodiment.

FIGS. 20a through 20c illustrate a small patch with ghost vertices about the boundaries according to some embodiments.

FIG. 21 shows ghost vertices that may be used when computing the Laplacian of a boundary vertex from the perspective of internal vertices, according to some embodiments.

FIGS. 24a through 24f show another example of editing a single patch, and illustrate a range of edits that are possible with single patches, according to some embodiments.

Figure 3:
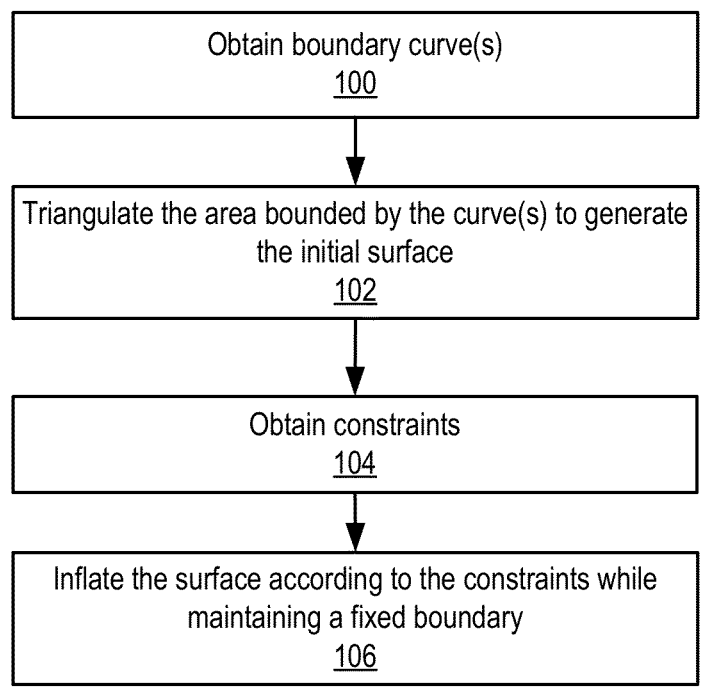
FIG. 3 is a flowchart of a surface inflation method according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for the interactive enhancement of two-dimensional (2D) art with three-dimensional (3D) geometry are described. Embodiments of a surface inflation method, which may be implemented as or in a tool, module, plug-in, stand-alone application, etc., may be used to create and modify 3D shapes by inflating the surface that interpolates the input boundaries. For simplicity, implementations of embodiments of the surface inflation method described herein will be referred to collectively as a surface inflation tool. Embodiments may be applied in one or more of, but not limited to, font design, stroke design, photo enhancement and freeform 3D shape design.

Various embodiments may use mean curvature constraints, surface normal constraints, or a combination of mean curvature constraints and surface normal constraints, as boundary conditions to control the inflation. The mean curvature of a surface is an extrinsic measure of curvature that locally describes the curvature of the surface. Thus, a mean curvature constraint is a specified value for the mean curvature at a particular boundary location, i.e. at a particular point or vertex on an external or external boundary, or for a particular segment of an external or internal boundary. A surface normal, or simply normal, to a flat surface is a vector perpendicular to that surface. Similarly, a surface normal to a non-flat surface is a vector perpendicular to the tangent plane at a point on the surface. Thus, a surface normal constraint specifies that, at this point on the surface (i.e., at a point on an external or internal boundary of the surface), the surface normal is to point in the specified direction. As an example, a user may want the surface normal at a point on a boundary to be facing 45 degrees out of plane to generate a 45 degree bevel, and thus may set the surface normal constraint to 45 degrees at the point. Surface normal constraint values may be specified at a particular boundary location, i.e. at a particular point or vertex on an external or internal boundary, or for a particular segment of an external or internal boundary.

One embodiment may use mean curvature constraints as boundary conditions. One embodiment may use surface normal constraints as boundary conditions. One embodiment may use either mean curvature constraints or surface normal constraints as boundary conditions. In one embodiment, both mean curvature constraints and surface normal constraints may be used as boundary conditions; for example, mean curvature constraints may be used on one portion of a boundary, and surface normal constraints may be used on another portion of the same boundary, or on another boundary. The mean curvature constraints and/or surface normal constraints may be applied to internal or external boundaries on the surface to be inflated. In embodiments, different values may be specified for the curvature constraints at different locations on a boundary. Embodiments may provide one or more user interface elements via which a user may specify or modify values for the constraints at locations on boundaries. Embodiments may provide one or more user interface elements via which a user may add, delete, or modify external or internal boundaries.

Figure 13A:
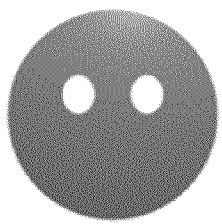
FIGS. 13a through 13h graphically illustrate freeform 3D shape design according to one embodiment.
Figure 13B:
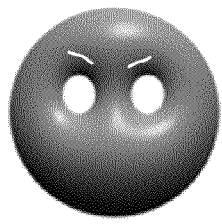

For examples of external and internal boundaries, see, for example, FIGS. 13a and 13b. The outer boundaries of the shaded surface in FIGS. 13a and 13b are examples of external boundaries. The two white lines over the "eyes" in FIG. 13b are examples of internal boundaries. Note that an internal boundary may be a single point, an open line or curve, or a closed boundary. Both external and internal boundaries may be considered a type of "constraint" on the surface, as the boundaries are fixed in position during inflation. Thus, internal boundaries and external boundaries may be referred to collectively herein as position constraints.

In addition to position constraints (external and internal boundaries), mean curvature constraints and surface normal constraints, some embodiments may allow other types of constraints to be specified. For example, one embodiment may allow pixel-position constraints to be specified at points or regions on a surface; the pixel-position constraints may be used to limit inflation along a vector. For example, a pixel-position constraint may be used to limit inflation to the z axis, and thus prevent undesirable shifting of the surface along the x and y axes. As another example, one embodiment may allow oriented position constraints to be added for surface normal constraints. Some embodiments may also allow arbitrary flow directions to be specified for regions or portions of the surface, or for the entire surface, to be specified. An example is a gravity option that causes the surface to flow "down".

Embodiments may leverage characteristics of linear variational surface editing techniques to perform the actual inflation, whether mean curvature constraints, surface normal constraints, or both are used. Linear variational surface editing techniques, using some order of the laplacian operator to solve for smooth surfaces, may provide simplicity and efficiency, but conventionally have not been explored fully for sketch-based modeling interfaces due to limitations. However, as shown herein, these limitations may be leveraged in embodiments to gain additional degrees of artistic freedom. For some domains of 3D modeling—in particular modeling-for-2D (e.g., 3D font design) and patch-based modeling—embodiments, by leveraging the characteristics of linear variational surface editing techniques, may provide efficiency, stability, and additional control.

In contrast to conventional methods that use an implicit surface representation to model surfaces, embodiments may use a polygon (e.g., triangle) mesh to inflate the given curves. Embodiments may use the inflation metaphor, but without using the chordal axis. Embodiments may allow both smooth and sharp internal boundaries drawn directly on the inflated surface to modify the surface. In contrast to conventional methods, embodiments implement a linear system and work around its deficiencies, instead of using a slower, iterative non-linear solver that is not guaranteed to converge. In addition, embodiments may provide a greater range of modeling operations than conventional methods. While this approach may not allow the solution of the whole mesh as a unified system, embodiments provide an alternative patch-based approach which may be more intuitive to users, as the global solve in conventional methods may result in surface edits tending to have frustrating global effects. While embodiments are generally described as using a triangle mesh, other polygon meshes may be used.

By using the mean curvature value or surface normal value stored at or specified for boundary vertices as a degree of freedom, embodiments are able to control the inflation of the surface efficiently using a single linear system. Embodiments may handle both smooth and sharp position constraints. Position constraint vertices may also have curvature constraints for controlling the inflation of the local surface.

Typically, the application of shape sketching interfaces is in 3D shape design. Conventionally, the two-dimensional (2D) boundaries drawn by the user are simply a means to get to the end result: the 3D shape. Instead of using the 2D boundaries to design 3D shapes, embodiments may use the resulting interpolated 3D shapes to enhance the existing 2D boundaries. That is, embodiments may apply the shape-sketching interface to another, interesting application: 2D art creation and design.

Using the inflation metaphor, embodiments may construct a 3D surface that interpolates a closed input boundary. Embodiments allow designers to modify the inflated surface with 3D shape modeling features such as sharp creases, smooth interpolation curves and local curvature control. Embodiments demonstrate that sophisticated geometric modeling techniques otherwise found in 3D shape modeling tools can effectively be used to design interesting looking images. FIG. 1 illustrates an example of results of surface inflation using an embodiment of the surface inflation tool as described herein. In this example, the word "Hello!" was input as a font outline (the boundary, a position constraint), boundary conditions (mean curvature and/or surface normal constraints) were added, and the surface of the characters was inflated according to the constraints using an embodiment of the surface inflation method.

Embodiments of the surface inflation tool construct the 2-manifold surface that interpolates the input boundary or boundaries. The surface may be computed as a solution to a variational problem. The surface inflation method implemented by the surface inflation tool may be formulated to solve for the final surface in a single, sparse linear equation, in one embodiment without requiring an additional strip of triangles at the boundary. In embodiments that employ mean curvature constraints, the mean curvature of the vertices on the boundary is a degree of freedom; the surface may be inflated by increasing these mean curvature values. In embodiments that employ surface normal constraints, additional ghost vertices may be used to control the surface normal internally and at surface boundaries; in this embodiment, the surface may be inflated by adjusting the surface normal constraints and thus rotating the boundary's ghost vertices around the boundary. Due to the variational setup, the inflated surface is smooth except near position constraints. The designer can add, remove, or modify internal boundaries and constraints at any time of the design phase, and these internal boundaries and constraints may be smooth or sharp. In one embodiment, the internal boundaries may also have curvature control or surface normal control (similar to the external boundaries), thereby allowing the designer to locally inflate or deflate the surface near the internal boundaries. In one embodiment, external and/or internal boundaries may have a stretching control, allowing the designer to extend the region that conforms to the target curvature constraint or surface normal constraint. In one embodiment, constraints may be specified as pixel-position constraints, meaning that they constrain their vertices to always project to the same pixel from some original camera view.

Embodiments of the surface inflation tool may use the inflation metaphor and allow both smooth and sharp position constraints drawn directly on the inflated surface to modify the surface. Embodiments may use mean curvature constraints and/or surface normal constraints to control the amount of inflation, which allows the problem to be formulated as a single linear system, unlike conventional methods.

Applications of the surface inflation tool may include one or more of, but are not limited to, font design, stroke design, enhancing photographs or other images, and modeling 3D shapes from scratch, examples of which are shown in the various Figures. Some embodiments of the surface inflation tool may be implemented, for example, as a plug-in for 2D art design tools such as Adobe® Illustrator® and GNU Gimp or as a plug-in for other types of image processing applications. Other embodiments may be otherwise implemented, for example as a stand-alone program or utility, or as a library function. Various embodiments of the surface inflation tool may obtain, manipulate, and output digital images in any of various digital image formats.

Work Flow

FIGS. 2a through 2c illustrate an example of workflow in a surface inflation tool according to one embodiment. External boundary curves are input, as indicated in FIG. 2a. The flat domain bounded by the input boundaries (FIG. 2a) is tessellated. In one embodiment, the tessellation used is triangulation. Boundary constraints (mean curvature constraints and/or surface normal constraints) are added, and the resulting surface (FIG. 2b) is inflated (FIG. 2c). In this example, the 2D boundaries may, for example, be authored in an art design tool such as Adobe® Illustrator® and read in as simple poly-line approximations. Other methods of obtaining the input 2D boundaries may be used in various embodiments.

FIG. 3 is a flowchart of a surface inflation method according to one embodiment. As indicated at 100, the surface inflation tool takes a closed 2D boundary as input. As indicated at 102, the surface inflation tool tessellates (e.g., triangulates) the area within the external boundary to generate the initial surface. As indicated at 104, boundary constraints (mean curvature constraints and/or surface normal constraints) may be added to the input boundaries. Other constraints and/or options, such as pixel position constraints and an arbitrary flow option, may also be specified for and applied to the surface to be inflated. As indicated at 106, the surface inflation tool then inflates the surface according to the specified constraints and options while maintaining a fixed boundary for the object being inflated.

Triangulation

As indicated at 102 of FIG. 3, the surface inflation tool tessellates the area within the external boundary to generate the initial surface. In performing the tessellation, some embodiments of the surface inflation tool may restrict the surface representation to a triangle mesh that is obtained by triangulating the surface within the external boundary. Any of various triangulation methods may be used to generate a high-quality triangulation. Some embodiments may maintain a maximum area constraint for the triangles (which may be provided as a configurable option in the triangulation method) to prevent rendering artifacts due to very large triangles.

An advantage of solving for the inflated surface using a triangle mesh (as opposed to a regular grid) is efficiency due to mesh adaptivity: the triangle mesh may be specified to have high detail only near complicated constraints, and to be coarse where there are not many constraints. In one embodiment, the mesh connectivity is not updated as the surface is inflated. In other embodiments, the mesh may dynamically be made denser in parts of the inflated shape that have high curvature, which may be more efficient and smoother in terms of rendering.

Surface Inflation

As indicated at 106 of FIG. 3, the surface inflation tool inflates the surface according to the specified constraints while maintaining a fixed boundary. In one embodiment of the surface inflation method, the unconstrained parts of the surface may be obtained by solving a variational system that maintains surface smoothness. Smoothness may be maintained because it gives an organic look to the inflated surface and removes any unnatural and unnecessary bumps and creases from the surface.

In one embodiment, the variational formulation may be based on the principles of partial differential equation (PDE) based boundary constraint modeling, where the Euler-Lagrange equation of some aesthetic energy functional is solved to yield a smooth surface. One embodiment may use a 'thin-plate spline' as the desired surface; the corresponding Euler-Lagrange equation is the biharmonic equation. In this embodiment, for all free vertices at position x, the PDE $\Delta^2(x)=0$ is solved. The solution of this PDE yields a $C^2$ continuous surface everywhere except at the position constraints (where the surface can be either $C^1$ or $C^0$ continuous). One embodiment may use cotangent-weight based discretization of the laplacian operator $\Delta(x)$.

The fourth-order PDE ($\Delta^2(x)=0$) may be too slow to solve interactively. Therefore, one embodiment converts the non-linear problem into a linear problem by assuming that the parameterization of the surface is unchanged throughout the solution. In practice, this means that the cotangent weights used for the Laplacian formulation are computed only once (using the flat, non-inflated surface) and are subsequently unchanged as the surface is inflated. This approximation has been used extensively for constructing smooth shape deformations, but it may significantly differ from the correct solution in certain cases. Instead of correcting this with a slower, sometimes-divergent, iterative non-linear solver, embodiments may characterize the linear solution and use its quirks to provide extra dimensions of artist control.

An advantage to using a linear system in the solver is that the linear system has a unique solution. In contrast, non-linear systems may generate multiple solutions (for example, a global and local minimum). Thus, using a non-linear system, the solver may get trapped in a local minimum, possibly yielding an undesired solution (i.e., the global optimum may not be found). Different non-linear solvers may arrive at different local minima. Thus, using a linear system may provide consistency and efficiency. A trade-off to using a linear system is that the resulting surface may not be quite as smooth as a globally optimal solution to a non-linear system. For artistic purposes, however, a solution produced by a linear system is sufficient.

Linear Systems

Mean Curvature Constraint Embodiments

The following describes the formulation of a variational linear system according to embodiments that use mean curvature constraints. In these embodiments, a linear system A $\bar{x}=\bar{b}$ may be implemented, where the matrix A is a sparse n×n matrix (where n is 3× the number of free vertices) that represents the local geometric relationships between the vertices and their neighbors. The vector $\bar{x}$ of length n represents the positions of free vertices and the vector $\bar{b}$ of length n represents the known quantities. For all three coordinates of every free vertex, an equation is formulated that is linear in terms of the vertex's neighbors. In one embodiment, the formulation may be based primarily on methods of discrete geometric modeling. A method has been described in the art to formulate a linear system that can handle smooth or sharp internal constraints; unfortunately the formulation requires a strip of triangles to complete the one-ring neighborhood of the boundary vertices. Generating this strip of triangles, especially when the boundary curve has large concavities, is not trivial. In addition, a surface modeling system has been described in the art that takes $G^1$ boundary constraints and does not need the special triangle strip on the boundary. However, this surface modeling system requires two linear solutions: one for the mean curvature scalar field and another for the positions that satisfy the computed mean curvature field. Embodiments of the surface inflation method combine the benefits of these two approaches. In so combining, embodiments of the surface inflation method that use the mean curvature constraint do not need a strip of triangles on the boundary to perform the inflation, and solve only one linear system. This is possible because the surface inflation method considers the mean curvature at the boundary vertices as a degree of freedom, one that can be used to inflate the surface.

One embodiment may use a conjugate-gradient implementation to solve the linear system $A\bar{x}=\bar{b}$. Since the matrix A is sparse, symmetric and positive-definite, other embodiments may factorize the matrix, which may decrease iterative update times. For example, in one embodiment, a Cholesky decomposition of the matrix A may be performed, and in one embodiment, a direct solver may be used to solve the linear system. Other solvers may be used to solve the linear system in other embodiments. For example, a sparse Cholesky solver or a conjugate-gradient solver may be used. Other techniques such as multi-grid solvers may also be used.

Figure 4:
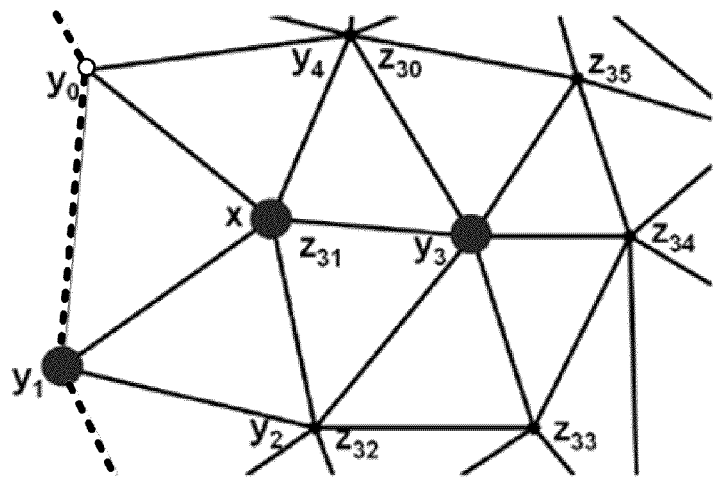
FIG. 4 illustrates a mesh vertex and one-ring neighbors according to one embodiment.

FIG. 4 illustrates a mesh vertex of position x and one-ring neighbors $y_i$ according to one embodiment. FIG. 4 illustrates various variables used in the equations below. Vertex x has neighbors $y_0, y_1$ on the boundary (constrained mean curvature) and neighbors $y_2, y_3, y_4$ in the interior with a full one-ring neighborhood (unconstrained mean curvature). The required $C^2$ smooth surface can be obtained by solving for a surface with a vanishing bi-Laplacian at all vertices:

$$\Delta^2(x) = \Delta(\Delta x) = 0 \quad (1)$$

The Laplacian at a mesh vertex is given by its one-ring neighborhood. A discrete laplace operator may be used, for example the Laplace-Beltrami operator defined for meshes may be used:

$$\Delta x = \frac{1}{(2A_x)}\left(x - \sum_i w_i y_i\right)$$

where $w_i$ are the normalized cotangent weights and $$\frac{1}{(2A_x)}$$

is a scaling term that includes the weighted area $A_x$ around the vertex x that improves the approximation of the Laplacian. Note that other laplace operators for meshes may be used in various embodiments. Substituting in equation (1):

$$\Delta^2 x = \frac{1}{(2A_x)}\Delta\left(x - \sum_i w_i y_i\right) = 0 \quad (2)$$

Since $\Delta$ is a linear operator:

$$\Delta^2 x = \Delta x - \sum_i w_i \Delta y_i = 0 \quad (3)$$

Consider the situation in FIG. 4, where some one-ring neighbors are in the mesh interior, and some are on the boundary. It is assumed that the mean curvature of the boundary vertices is given as a constraint. Assume $y_j$ represents the one-ring vertices whose mean curvatures $h_{y_j}$ are known. For those vertices, the Laplacians may be computed simply by using the expression $\Delta y_j = (h_{y_j} n_{y_j})/2$. Moving such known Laplacians to the right hand side of equation (3), the following is obtained:

$$\Delta^2 x = 0 \Rightarrow \Delta x - \sum_i w_i \Delta y_i = \sum_j \frac{w_j h_{y_j} n_{y_j}}{2} \quad (4)$$

Note that the term $(h_{y_j} n_{y_j})/2$ essentially represents a force of magnitude $0.5 h_{y_j}$ in the direction $n_{y_j}$ applied by the neighboring vertex $y_j$ on vertex x. In some embodiments, the force is applied in the direction of the initial vertex normal (the normal in the flat configuration—the Z axis). One embodiment does not use the vertex normals from the inflated state, as that may produce non-linear vertex motion that is path-dependent and unintuitive.

Therefore, by increasing the value of $h_{y_j}$, the magnitude of the force on the vertex x is increased, effectively pushing it up.

Finally, the laplacians of vertices with unknown mean curvatures is expanded in equation (3) to get the linear equation for the free vertex x:

$$x - \sum_i w_i y_i - \sum_i w_i \left[y_i - \sum_k w_{ik} z_{ik}\right] = \sum_i \frac{w_j h_{y_j} n_{y_j}}{2} \quad (5)$$

Constructing such equations for every free vertex yields the linear system $A\bar{x} = \bar{b}$, the solution of which provides the inflated surface.

Surface Normal Constraint Embodiments

The following describes the formulation of a variational linear system according to embodiments that use surface normal constraints. In embodiments, a linear system $A\bar{x} = \bar{b}$ may be implemented, where the matrix A is a sparse n×n matrix (where n is 3× the number of free vertices) that represents the local geometric relationships between the vertices and their neighbors. The vector $\bar{x}$ of length n represents the positions of free vertices and the vector $\bar{b}$ of length n represents the known quantities. For all three coordinates of every free vertex, an equation is formulated that is linear in terms of the vertex's neighbors. In this embodiment, the formulation may be based primarily on a method of discrete geometric modeling, with the addition of constraint types. A method has been described in the art to formulate a linear system that can handle smooth or sharp internal constraints; unfortunately, the formulation requires a strip of triangles to complete the one-ring neighborhood of the boundary vertices. Generating this strip of triangles, especially when the boundary curve has large concavities, is not trivial. Therefore, embodiments of the surface inflation tool that use a surface normal constraint provide a method to "fake" these triangles with locally-correct "ghost" vertices.

Figure 5:
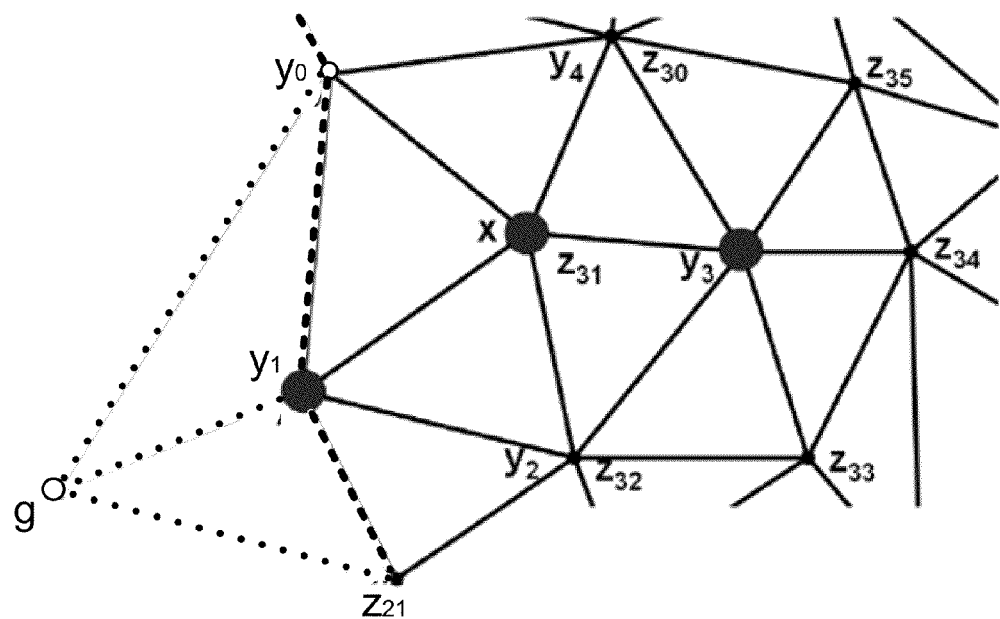
FIG. 5 illustrates a mesh vertex of position x and one-ring neighbors $y_i$ according to one embodiment.

FIG. 5 illustrates a mesh vertex of position x and one-ring neighbors $y_i$ according to one embodiment. FIG. 5 shows various variables used in the equations below. Vertex x has neighbors $y_0, y_1$ on the boundary, and neighbors $y_2, y_3, y_4$ in the interior with a full one-ring neighborhood. Each boundary vertex has its own ghost vertex and two corresponding ghost triangles—for example, $y_1$ has ghost vertex g—to artificially provide the required one-ring neighborhood.

Consider a mesh vertex of position x and one-ring neighbors $y_i$ as shown in FIG. 5. A $C^2$ smooth surface can be obtained by solving for a surface with a vanishing bi-Laplacian at all vertices:

$$\Delta^2(x) = \Delta(\Delta x) = 0 \quad (6)$$

The Laplacian at a mesh vertex is given by its one-ring neighborhood:

$$\Delta x = \Sigma_i w_i(x-y_i)$$

where $w_i$ are the unnormalized cotangent weights scaled by inverse vertex area. Substituting in equation (6):

$$\Delta^2 x = \Delta\left(\sum_i w_i(x-y_i)\right) = 0 \quad (7)$$

Since $\Delta$ is a linear operator:

$$\Delta^2 x = \sum_i w_i \Delta x - \sum_i w_i \Delta y_i = 0 \quad (8)$$

This expands finally to:

$$\left(\sum_i w_i\right)^2 x - \left(\sum_i w_i\right)\left(\sum_i w_i y_i\right) - \sum_i w_i\left[\left(\sum_k w_{ik}\right) y_i - \sum_k w_{ik} z_{ik}\right] = 0 \quad (9)$$

where $z_{ik}$ refers to ghost vertices where necessary to complete a one-ring. In one embodiment, constrained vertices may be treated as absolute constraints, so their positions are moved to the right hand side of the system. Because it may be convenient to over-constrain the system, and satisfy other types of constraints in a least squares sense, in one embodiment the whole equation may be scaled by the inverse of:

$$\left(\sum_i w_i\right)^2$$

so that the magnitude of errors will be proportional to a difference in positions, and not scaled by any area or mean curvature values. Constructing such equations for every free vertex gives the linear system $A\bar{x}=\bar{b}$, whose solution provides the inflated surface. Since the construction is not symmetric and may be over-constrained, it may be solved using the normal equations.

Placement of Ghost Vertices

In one embodiment, for each patch of a mesh surface, a canonical view direction may be assumed to be known; this may be the direction from which, for example, an original photograph was taken, or from which the original boundary constraints were drawn. An 'up' vector which points towards the camera of this canonical view may be derived. Ghost vertices may then be placed in a plane perpendicular to the 'up' vector, and normal to the constraint curve of their parent vertex. In one embodiment, each ghost vertex may be placed the same fixed distance d from the curve. For example, in FIG. 5, assuming a vector out of the page u, the ghost vertex g is positioned at:

$$y_1 + d(u \times (z_{21}-y_0))/\|u \times (z_{21}-y_0)\|$$

The ghost vertices may then be rotated about the tangent of the constraint curve (the boundary) to change the normal direction.

Note that ghost vertices may be added for both external and internal boundaries.

Internal Constraints

Figure 6:
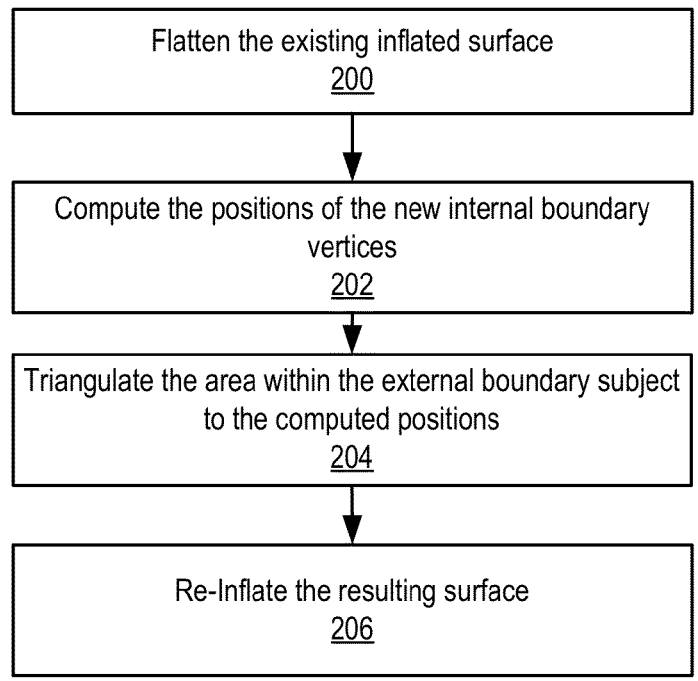
FIG. 6 is a general flowchart of a method for re-initializing and solving the linear system, according to embodiments.

In embodiments, the user may draw internal boundaries as internal position constraints anywhere on an inflated surface to automatically obtain the new inflated surface with the new internal boundaries in place. The user may also specify boundary constraints (mean curvature and/or surface normal constraints) for the internal boundaries. Upon adding a new internal boundary, the linear system $A\bar{x}=\bar{b}$ needs to be re-initialized and solved. FIG. 6 is a general flowchart of a method for re-initializing and solving the linear system, according to embodiments. The re-solving may be performed differently for internal boundaries with mean curvature constraints than for internal boundaries with surface normal constraints.

The existing surface (without the new internal boundary) is flattened by changing the boundary vertex mean curvatures to zero and moving all internal position constraints to their 2D positions, as indicated at 200. The 2D positions of the new internal boundary vertices are computed by using the barycentric coordinates within the flattened triangle mesh, as indicated at 202. The area bounded by the external boundary is tessellated (e.g., triangulated) subject to the 2D positions of the internal boundaries, as indicated at 204. The resulting surface is re-inflated, as indicated at 206. In one embodiment, for mean curvature constraints, this may be performed by setting the boundary vertex mean curvatures to the original values and moving the position constraint curves to their old positions. In one embodiment, for surface normal constraints, the resulting surface may be re-inflated by moving the position constraint curves to their old positions and re-solving the system for the positions of the free vertices.

Figure 7A:
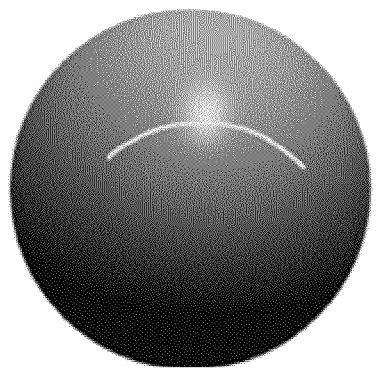
FIGS. 7a through 7d graphically illustrate steps for adding constraints according to one embodiment.
Figure 7B:
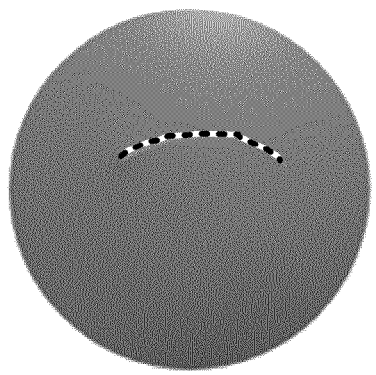
Figure 7C:
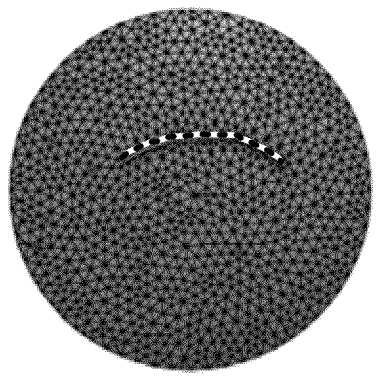
Figure 7D:
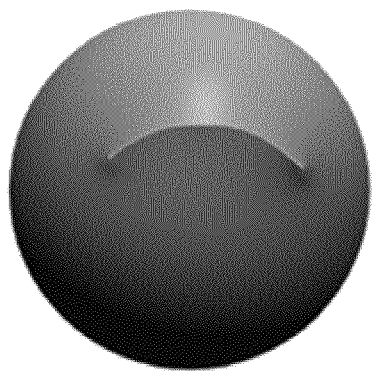

FIGS. 7a through 7d graphically illustrate an example that shows the above methods for adding internal boundaries according to embodiments. Suppose the user wants a sharp internal boundary. The user may draw an internal boundary on the inflated surface, as illustrated in FIG. 7a. The user may add mean curvature constraints and/or surface normal constraints to the new internal boundary. The user may also add, remove, or modify mean curvature constraints and/or surface normal constraints to the external boundary if desired. Other constraints, such as pixel position constraints, may also be added to, removed from, or modified for the surface. The surface inflation tool flattens the inflated surface and computes the 2D position of the internal boundary, as illustrated in FIG. 7b. The surface inflation tool then re-tessellates the domain subject to the new internal boundary, as illustrated in FIG. 7c, re-inflates the surface, and in one embodiment moves the internal boundary to its original location to generate the new inflated surface as illustrated in FIG. 7d. In one embodiment, the operations shown in FIGS. 7b and 7c may be performed transparently to the user.

Smoothness of Position Constraints

In one embodiment, either smooth ($C^1$) or sharp ($C^0$) position constraints may be specified. The smoothness value may be varied by assigning a weight to the constrained vertex in equation (5) or in equation (9). In one embodiment, the weight that controls the smoothness of the position constraints may take any floating point value between 0 ($C^0$ continuous) and 1 ($C^1$ continuous). However, in one embodiment, it may be useful to have only two options (smooth/sharp), and to draw position constraints with a fixed smoothness for all vertices. Other embodiments may allow the use of varying smoothness across individual position constraints. FIGS. 14*a* through 17*c* shows some examples of smooth/sharp position constraints.

Curvature Constraints

In one embodiment, curvature constraints may be specified along with position constraints. When the value of a curvature constraint is modified, the surface is modified so that the approximation of the mean curvature at the constraint point matches the value of the curvature constraint. The curvature constraint may be used to locally inflate or deflate the surface around the position-constrained vertices. As such, embodiments may provide a sketch-based modeling gesture. In one embodiment, the initial value for the curvature constraint is set to zero, but in other embodiments the initial value may be set to any arbitrary value.

Options for Constraints

Assigning a mean curvature constraint or a surface normal constraint to a vertex is an indirect method of applying a force to their one-ring neighbors along the direction perpendicular to the initial, flat surface. However, in some embodiments, the default behavior may be modified, and additional forces may be applied in arbitrary directions. As an example, in one embodiment, a 'gravity' option may be added to the curvature constraints where another force is applied in a slightly downward direction (to the right hand side of equation (5)), causing the entire surface to bend downwards. This may be used, for example, to create the illusion of a viscous material on a vertical plane. See, for example, FIG. 11*b* and FIG. 13*h*. In some embodiments, other directions than "down" may be specified to cause the surface to flow in a specified direction.

Oriented Position Constraints

Figures 8A, 8B, 8C:
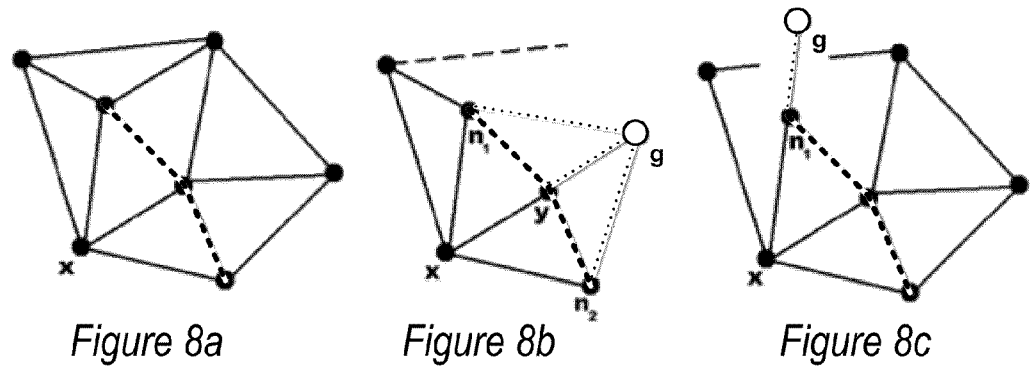
FIGS. 8a through 8c illustrate oriented position constraints according to one embodiment.

In one embodiment, the ghost vertex concept described for surface normal constraints may be extended to internal boundaries that may be used to control the orientation of the surface along the internal boundaries. In one embodiment, to do so, the way the laplacian at the constrained vertex is calculated may be modified, as shown in FIGS. 8*a* through 8*c*. As seen in FIGS. 8*a* through 8*c*, the ghost laplacians extend naturally to internal boundaries except at the endpoints of open internal boundaries; here there are no longer well defined sides of the curve (especially for internal boundaries which are just a single point) and therefore a different method should be used for computing the laplacian. In one embodiment, the laplacian in this degenerate case may be defined using just the originating vertex x for which the bilaplacian is being computed and the opposing ghost vertex g as the "'one ring'" of the constrained vertex. Since the measures of vertex area and cotangent weights do not extend to this case, the sum of area-normalized cotangent weights from the originating vertex may be used. The method then lets the two vertices share that weight sum equally. Therefore, the laplacian may be defined as:

$$(w_i \Sigma_i w_i) y_i - (g+x) w_i / (2 \Sigma_i w_i)$$

FIGS. 8*a* through 8*c* illustrate oriented position constraints according to one embodiment. An internal oriented position constraint line is shown in FIG. 8*a*. When calculating the bilaplacian of vertex x, one embodiment may calculate the laplacian at y by creating ghost g, so the one ring of vertex y is (x, n1, g, n2) as shown in FIG. 8*b*. Note that $n_1$ is on the end of the constraint line, so to compute its laplacian g is instead placed along the vector from x to $n_1$, and the laplacian at $n_1$ is computed using only vertices x, $n_1$, and g.

Pixel-Position Constraints

Figure 9:
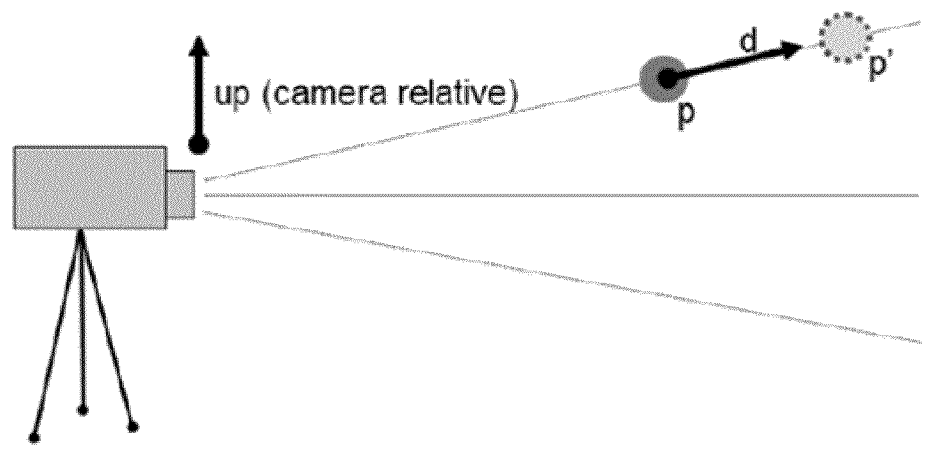
FIG. 9 illustrates pixel-position constraints according to one embodiment.

FIG. 9 illustrates pixel-position constraints according to one embodiment. Referring to FIG. 9, a pixel-position constraint allows a vertex p to move freely along vector d. A user may wish to constrain a vertex (or a region) on the surface to always project to the same position in screen space from a given view, without fully constraining the position of that vertex or region. In one embodiment, this may be allowed by over-constraining the linear system with additional constraints referred to as pixel-position constraints. These constraints may be written into the matrix as two linear constraints for two arbitrary unit vectors orthogonal to the camera ray d—$o_1$ and $o_2$. For a point p with initial position p', the constraint equations are $o_1 \cdot (p-p')=0$, and the equivalent for $o_2$.

Note that without pixel-position constraints, the linear system may be written separately for x, y and z, but for arbitrary pixel position constraints, x, y and z may be arbitrarily coupled. This may have a performance cost, as the matrix would be nine times larger. For less free-form applications, it may therefore be useful to keep the system decoupled by implementing pixel-position constraints only for axis-aligned orthogonal views. In these cases the constraint is simply implemented by fixing the vertex coordinates in two dimensions and leaving it free in the third.

Pixel position constraints may be used with mean curvature constraints, with surface normal constraints, or with a combination of mean curvature constraints and surface normal constraints.

Mixing Pixel-Position and Orientation Constraints

In many cases, orientation and pixel-position are known, but it may not be desired by the artist to fix the position fully—for example, when modeling a face, there may be a certain angle at the nose, but the artist may still want to allow the nose to move smoothly out when puffing out the cheeks of the character. To allow this, one embodiment may mix pixel-position and orientation constraints. The vertex loses its bilaplacian smoothness constraints, and gains ghost vertices and pixel-position constraints. Ghost vertices are specified relative to the free vertices of the pixel-position constraint, instead of absolutely. However, this removes three bilaplacian constraint rows in the matrix for every two pixel-position rows it adds (assuming a coupled system) making the system underconstrained. Therefore, additional constraints may be needed. In one embodiment, for a first additional constraint, it may be observed that when a user draws a line of pixel-position constraints, they likely want the line to retain some smoothness or original shape. For adjacent vertices $p_1$, $p_2$ on the constraint line, which are permitted to move along vectors $d_1$ and $d_2$ respectively, one embodiment may therefore constrain the vertices to satisfy:

$$(p_1-p_2) \cdot (d_1+d_2)/2=0$$

Since the system is still one constraint short, one embodiment may add an additional constraint specifying that the laplacian at the endpoints of the constraint line (computed without any ghost vertices) should match the expected value (which is known by the location of the ghost vertices relative to the constraint curve). Scaling these laplacian constraints adjusts the extent to which the constrained vertices move to satisfy the normal constraints.

Exploiting the Linearization

The system described herein is a linear system because the non-linear area and cotangent terms have been made constant, as calculated in some original configuration. The linearization may be thought of as allowing the 'stretch' of triangles to be considered as curvature, in addition to actual curvature; therefore variation is minimized in triangle stretch+curvature, instead of just curvature. In some embodiments, this can be exploited by intentionally stretching triangles: for example, by intentionally moving ghost vertices, their area of effect may be increased. This is similar to moving a bezier control point along the tangent of a curve.

The linearization may also cause the solution to collapse to a plane if all of the control vertices are coplanar. This may be visible in the system as the ghost vertices at the boundaries are rotated to be coplanar and inside the shape, resulting in a flat, folded shape. However, in one embodiment, the need for modeling this shape with a single linear system may be avoided by allowing the system to be used as a patch-based modeling system, with ghost vertices enforcing $C^1$ continuity across patch boundaries.

Applications of Embodiments

The following describes some examples of applications of embodiments of the surface inflation tool, and is not intended to be limiting.

3D Font Design

An application of embodiments of the surface inflation tool may be in font design. The outline of a font character may be inflated to provide depth to the font. Moreover, the shape of the inflated character can be controlled and enhanced by adding smooth or sharp position constraints and boundary constraints (either mean curvature constraints, surface normal constraints, or both).

Figure 10A:
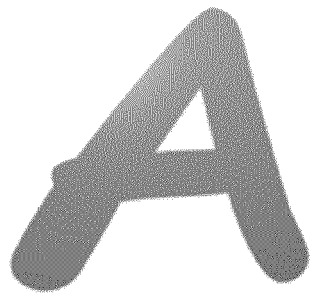
FIGS. 10a through 10e illustrate an example of 3D font design according to one embodiment.
Figure 10B:
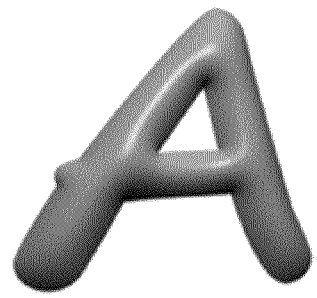
Figure 10C:
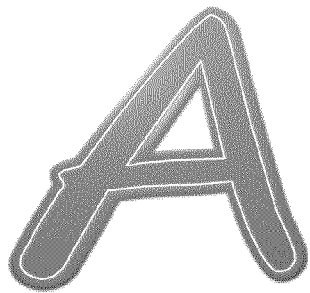
Figure 10D:
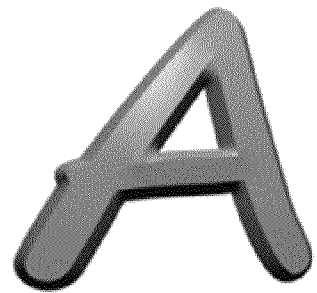
Figure 10E:
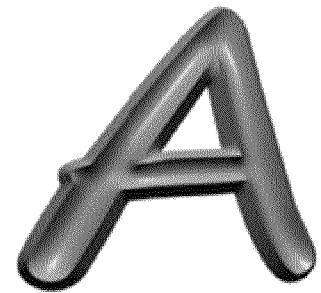

FIGS. 10a through 10e illustrate an example of 3D font design according to one embodiment. The letter 'A' is read in as a pair of closed boundary curves (the external boundary), as illustrated in FIG. 10a. By increasing the mean curvature at the constrained boundary vertices, the surface bounded by the input curves is inflated, as illustrated in FIG. 10b. Next, internal offset curves are read in as curvature and sharp position constraints, as illustrated in FIG. 10c. The internal curves are raised to give a beveled effect, as illustrated in FIG. 10d, and then made sharper by increasing the curvature at the curve vertices, as illustrated in FIG. 10e.

Stroke Design

In addition to inflating already complete input 2D curves (such as a font outline), embodiments of the surface inflation tool may be used as a tool for inflating 2D elements as they are generated. One example is that of strokes. Currently, art tools such as Adobe® Illustrator® support strokes with a variety of brush shapes, thickness, and incident angles. Embodiments may allow the addition of another option to a stroke: depth. Varying stroke depth may be implemented in embodiments by changing the mean curvature or the surface normal at the stroke boundary. Moreover, in one embodiment, the medial axis of the stroke may be provided as a constraint curve, further increasing the range of stroke shapes possible.

Figure 11A:
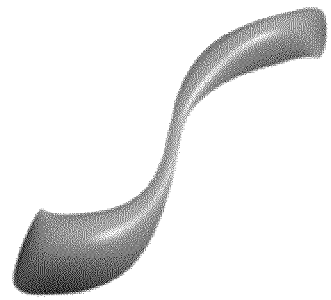
FIGS. 11a through 11d illustrate an example of stroke design according to one embodiment.
Figure 11B:
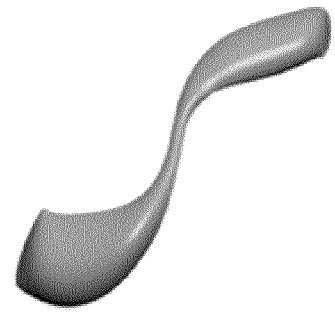
Figure 11C:
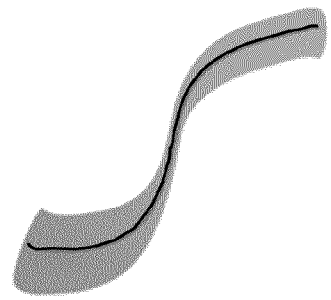
Figure 11D:
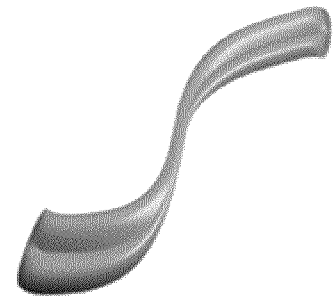

FIGS. 11a through 11d show an example of stroke design according to one embodiment. The surface inflation tool is used to inflate the outline of a paintbrush stroke, as illustrated in FIG. 11a. The gravity option may be selected to produce an effect of paint drip, as illustrated in FIG. 11b. The stroke axis is added as a sharp position constraint, as illustrated in FIG. 11c. A grooved stroke is produced by inflating the rest of the surface, as illustrated in FIG. 11d.

Photograph Inflation

Another application of embodiments of the surface inflation tool may be in photograph inflation, or more generally digital image inflation. For example, using the surface inflation tool, a user can interactively add depth to an input photograph or other digital image by drawing and manipulating position constraints on the image. As another example, a tool such as a boundary tracking or object location tool may be used to automatically locate boundaries on an image, e.g. a digital photograph, and the boundaries may be input to the surface inflation tool as position constraints. The position constraints can be smooth (for images containing rounded edges), sharp (images of rectilinear shapes), or a combination thereof. Mean curvature constraints, surface normal constraints, or both types of boundary constraints may be specified for the boundaries on the image.

Figure 12A:
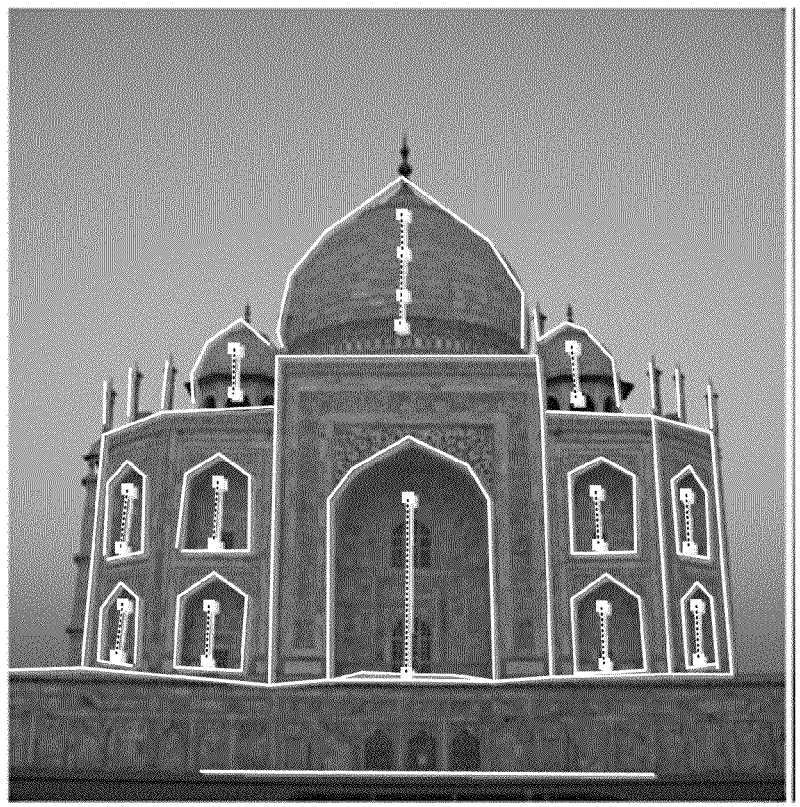
FIGS. 12a and 12b show an example of photograph inflation according to one embodiment.
Figure 12B:
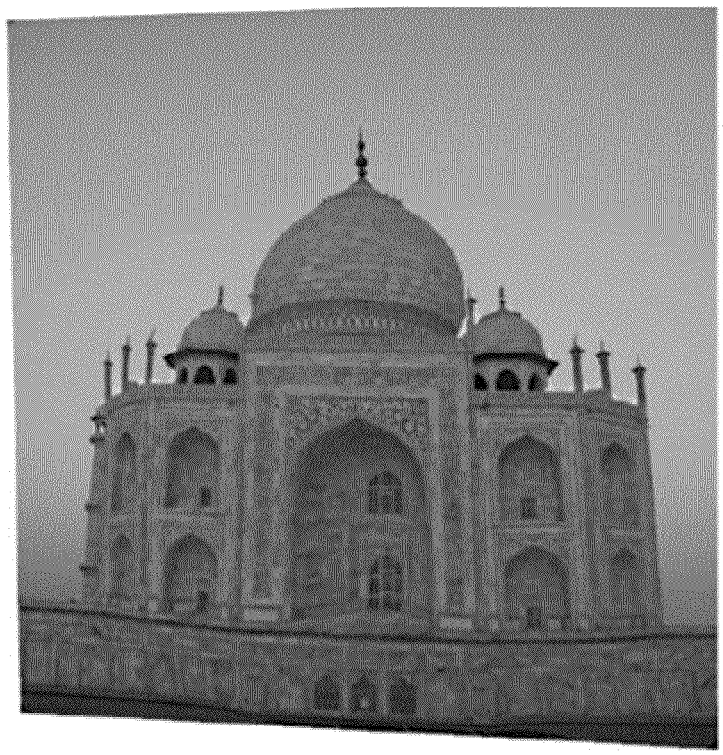

FIGS. 12a and 12b show an example of photograph inflation according to one embodiment. In the example, the surface inflation tool is used to inflate a digital photograph of the Taj Mahal. Position constraint curves of varying types (e.g., smooth, sharp, and curvature constrained) are specified, as illustrated by the white lines in FIG. 12a, to define the inflated shape. In FIG. 12a, the solid white lines represent sharp position constraints, while the black dotted lines represent smooth position constraints. A sharp position constraint is where the surface passes through the position constraint curve, but does not maintain geometric smoothness across the position constraint curve. A smooth position constraint is where the surface passes through the position constraint curve while maintaining smoothness across the position constraint curve. The squares associated with the dotted lines represent locations that have been selected to specify the position constraints. For example, two squares at the end of a line represent locations that were selected to specify the line between the squares. In one embodiment, the locations represented by the squares may be selected by mouse-clicking at the locations. As an example, in the top-most dome of the Taj Mahal, four different points of a smooth curve (dotted lines) with different depth levels produce the inflated dome shape. The sharp position constraint curves surrounding the dome (solid white lines) prevent the inflation from propagating beyond the dome. After the desired constraints are specified, the image may be inflated using the surface inflation method as described herein to generate an inflated image, as illustrated in FIG. 12b.

3D Shape Modeling

Embodiments of the surface inflation tool may be used in the freeform design of arbitrary 3D shapes. By adding smooth and/or sharp position constraints and boundary constraints, an inflated shape may be modified. Mean curvature constraints, surface normal constraints, or both constraints may be used.

Figure 13C:
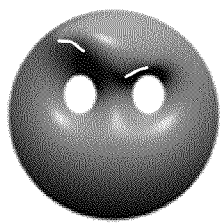
Figure 13D:
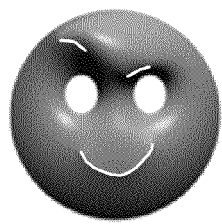
Figure 13E:
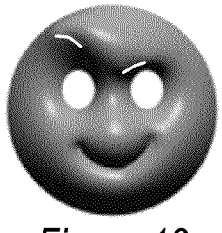
Figure 13F:
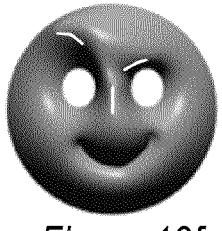
Figure 13G:
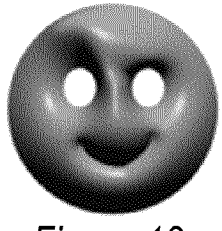
Figure 13H:
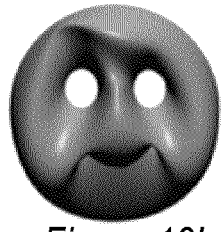

FIGS. 13a through 13h graphically illustrate freeform 3D shape design according to one embodiment. Given the outline of a cartoon face (FIG. 13a), the interior is inflated, and two smooth position constraints are added near the eyebrows (FIG. 13b). One of the eyebrows is pulled up and the other is pulled down (FIG. 13c). A sharp position constraint is added near the mouth (FIG. 13 *d*) and the nearby surface is inflated by modifying the mean curvature constraints or the surface normal constraints (FIG. 13*e*). A smooth position constraint is added near the bridge of the nose (FIG. 13*f*) to get the final surface (FIG. 13*g*). A gravity or other directional flow may optionally be added (see above discussion) for this 3D shape to create a directional flow effect (FIG. 13*h*).

Surface Normal Constraint Examples

FIGS. 14*a* through 16*b* illustrate examples of the application of surface normal constraints, and also show the effect of smooth position constraints, according to some embodiments. These examples show that surface normal constraints may be used (rotated) to generate concave, flat, or convex angles at boundaries.

Figure 14A:
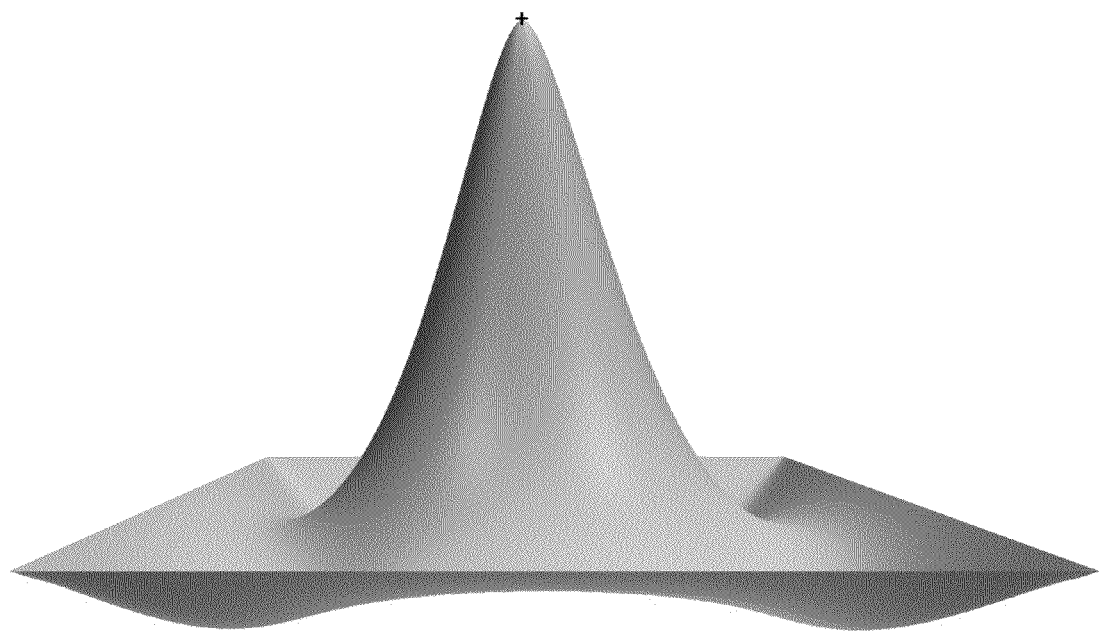
FIGS. 14a and 14b show an example surface generated with a smooth position constraint and with a concave angle at the boundary as specified using surface normal constraints, according to one embodiment.
Figure 14B:
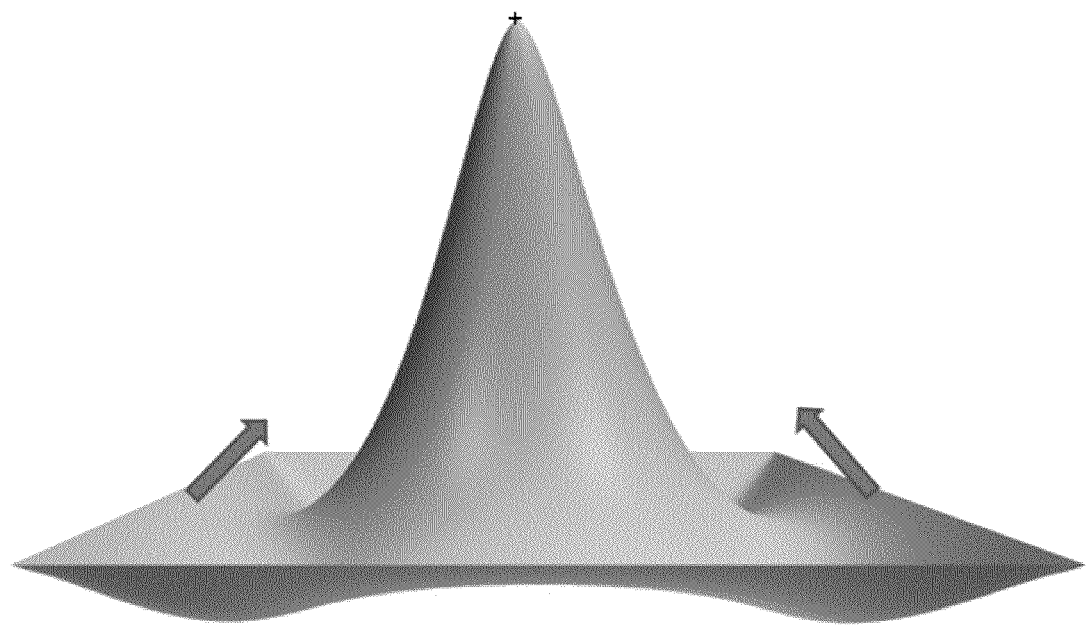

FIGS. 14*a* and 14*b* show an example surface generated with a smooth position constraint at the position indicated by the "+", and with a concave angle at the boundary as specified using surface normal constraints, according to one embodiment. The arrows in FIG. 14*b* indicate the direction of the surface normal at the external boundary of the surface.

Figure 15A:
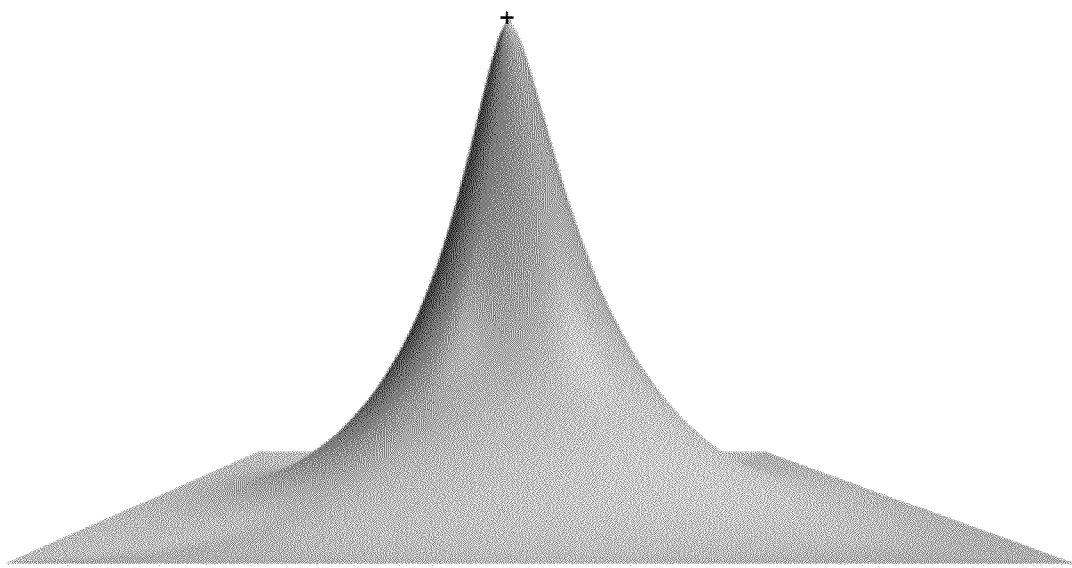
FIGS. 15a and 15b show an example surface generated with a smooth position constraint and with a flat angle at the boundary as specified using surface normal constraints, according to one embodiment.
Figure 15B:
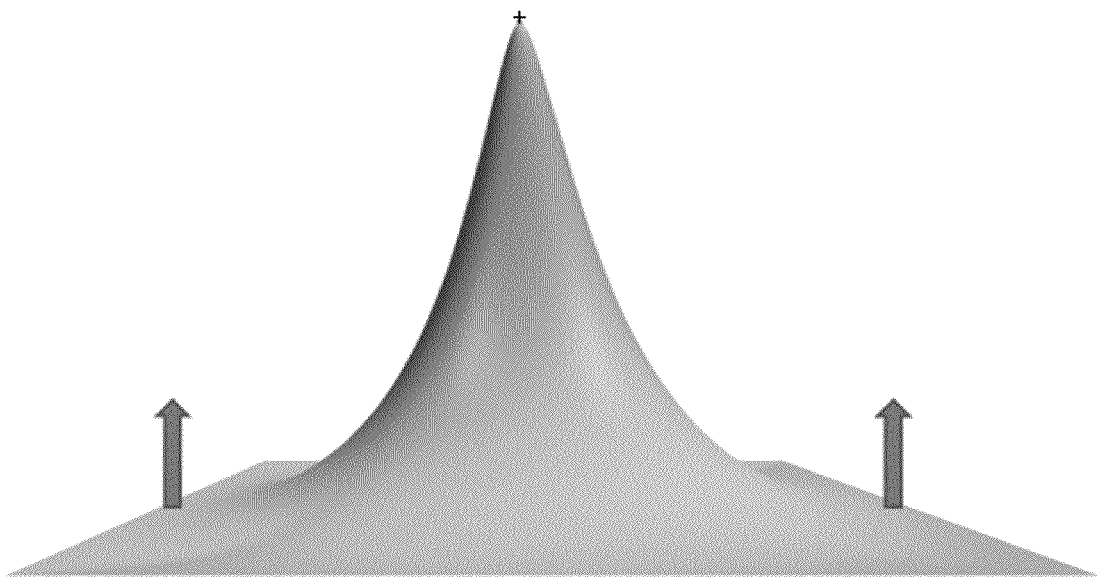

FIGS. 15*a* and 15*b* show an example surface generated with a smooth position constraint at the position indicated by the "+", and with a flat angle at the boundary as specified using surface normal constraints, according to one embodiment. The arrows in FIG. 15*b* indicate the direction of the surface normal at the external boundary of the surface.

Figure 16A:
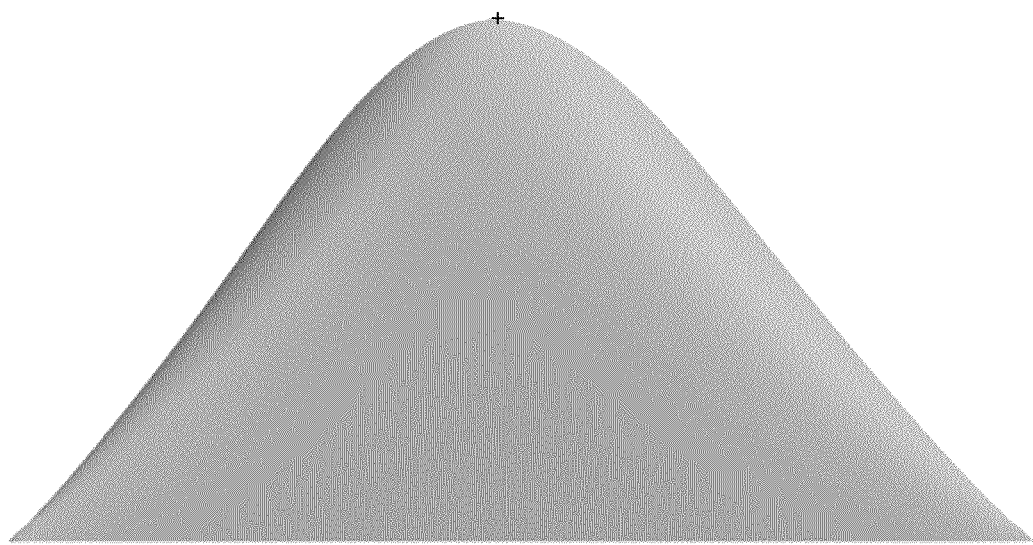
FIGS. 16a and 16b show an example surface generated with a smooth position constraint and with a convex angle at the boundary as specified using surface normal constraints, according to one embodiment.
Figure 16B:
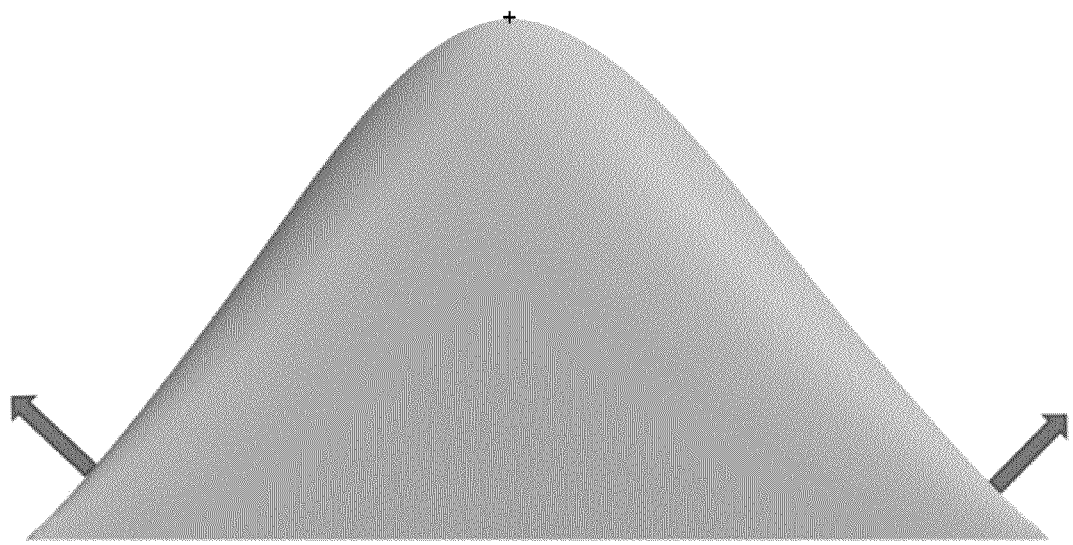

FIGS. 16*a* and 16*b* show an example surface generated with a smooth position constraint at the position indicated by the "+", and with a convex angle at the boundary as specified using surface normal constraints, according to one embodiment. The arrows in FIG. 16*b* indicate the direction of the surface normal at the external boundary of the surface.

Figure 17A:
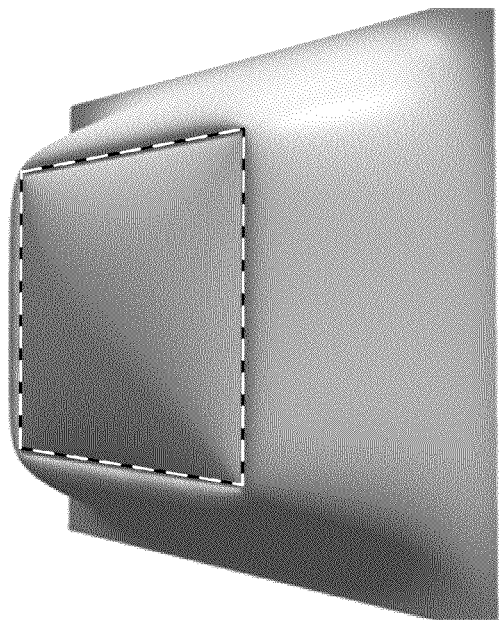
FIGS. 17a through 17c illustrate modifying the angle(s) at an internal boundary of an example surface using surface normal constraints, according to some embodiments.
Figure 17B:
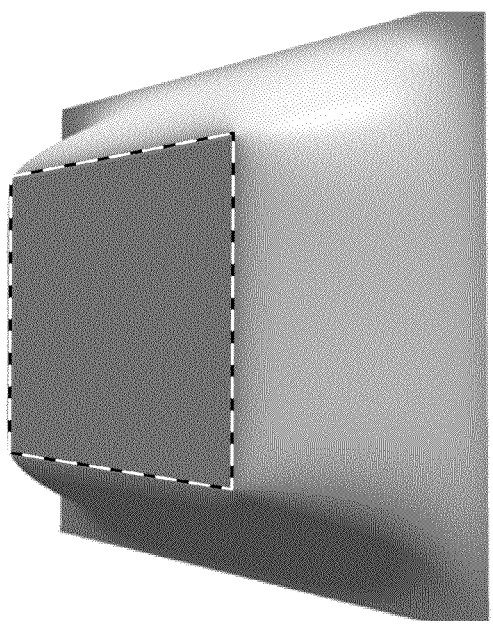
Figure 17C:
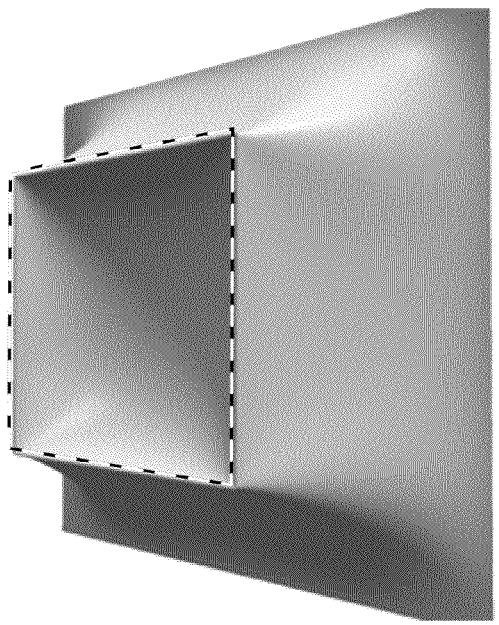

FIGS. 17*a* through 17*c* illustrate modifying the angle(s) at an internal boundary of an example surface using surface normal constraints, according to some embodiments. The internal boundary in the images is represented by the black-and-white dashed line. FIG. 17*a* shows flat angles across the internal boundary. FIG. 17*b* shows sharp angles across the internal boundary. FIG. 17*c* shows that the surface is locally inflated with varying angles at the internal boundary.

Modeling 3D Surfaces from Curves

Sketch-based modeling refers to the modeling of 3D shapes from sketches. The user has high-level, intuitive control over the surface (via parameters stored at the curves) and does not have to directly manipulate the surface vertices. Sketch-based modeling of smooth shapes may allow novice users to quickly create complex, organic 3D shapes from sketches. Novice users can intuitively model and edit 3D shapes by drawing curves that denote significant shape features. These curves, typically the boundaries or silhouettes of the desired shape, act as constraints for the 3D model. The surface must pass through these constraints and is usually kept smooth in all unconstrained regions. The user controls the 3D shape by modifying the constraint curves.

Research in sketch-based modeling of smooth shapes has focused on the ability to intuitively yet exactly control the surface near important feature curves. In particular, the ability to specify sharp features and to control the shape of the surface near those sharp features has increased the types of shapes that can be modeled from sketches. Sketch-based modeling is no longer useful only for constructing models of primarily round, lumpy shapes, but can also be applied to construct models of organic shapes with some sharp features.

As sketch-based shape editing approaches mature, a framework for processing the curves drawn by the user and for interactively producing 3D surfaces as output is needed.

Two components that together may form a geometry framework for modeling 3D shapes from sketches are presented: an example N-sided Variational Patch technology that may be used in some embodiments, and several user interface workflows or methods that, given an N-sided patch representation, may simplify the construction of complex 3D models from sketches.

An example arbitrary-sided (N-sided) variational surface patch technology that may be used for interpolating a network of sketched curves is described. The input to the patch is a closed 3D space curve with position and normal information at all points along the curve. The underlying system treats the input curve as the boundary and automatically generates the surface that interpolates the boundary conditions with $G^1$ continuity. The patch boundary may have any number of sides and may be concave anywhere. Additionally, each patch may have an arbitrary number of holes and internal constraint curves that the surface interpolates with $G^1$ or $G^0$ continuity. The patch can represent most or all of the shapes users would expect to create with a sketch-based interface.

Several user interface workflows or methods that, given a patch representation of a surface, greatly simplify the construction of 3D models from sketches are described. One workflow is to convert an existing 2D sketch into a 3D model, for example by leveraging the ability of the N-sided patch technology described herein to produce 3D constraint curves. Another workflow leverages the ability to make a separate patch out of existing curves, thereby allowing us a single patch to be incrementally decomposed into a complex shape with several patches. A "cut-and-paste" workflow for creating new constraints by copying and pasting constraints from one part of the model to another is also described. Finally, a method for drawing constraint curves on simple 3D shapes to produce complex surface patches is described. Using this framework and the workflows, shapes may be produced that previously were difficult to model using conventional modeling systems including conventional sketch-based modeling systems.

While an example N-sided patch technology is described herein that may be used to generate the patch representations of surfaces to which the workflows described herein may be applied, variations on the described N-sided patch technology, or other patch technologies or techniques, may be used to generate the patch representations.

The workflows and methods described herein are not specific to the quick, informal sketching gestures prevalent in most sketch-based modelers; curves precisely drawn on a 2D image as a "sketch" in the context of 3D modeling are also considered.

For any feature curve, embodiments may allow the user to control the surface normal and tangent strengths on either side of the feature curve. Embodiments allow the user separate the surface into smaller patches that seam together with $G^1$ continuity. Decomposing the surface into multiple patches prevents the solution of a large global linear system (i.e. improved efficiency), and provides locality of surface edits. Each patch, while retaining both boundary and internal curve constraints, is solved independently, thus ensuring that local edits only affect local regions of the surface. This not only aids in the modeling process but also may improve performance of the overall system. Furthermore, the surface between feature curves is important to the overall shape of the object. Some embodiments may address this by allowing the user to control the surface normal and, indirectly, the curvature along the feature curve lines. For sharp feature curves, embodiments may allow the user to control these properties on either side of the curve. Allowing this additional degree of control may reduce the number of feature curves that the user needs to draw to describe the surface. Embodiments thus provide the artist with a large degree of control without being overly restrictive and complicated.

N-Sided Variational Patches

Some embodiments may use an N-sided variational surface patch as a basic modeling primitive. The term "variational" is used because the surface of each patch is expressed as an approximate thin plate spline satisfying internal and boundary constraints, and is obtained by solving a linear optimization problem. Each patch may be interpolated as an approximate thin plate spline satisfying internal and boundary constraints. By specifying normals at the patch boundaries, tangent plane smoothness is ensured across the patch boundaries, and each patch may be considered as an independent linear system.

The input to a patch is a closed, 3D polyline with optional internal polylines (open or closed). None of the polylines may intersect except at endpoints. The area bounded by the outer polyline is triangulated, giving an initial, flat surface. This flat surface is used to build a linear algebraic system for the patch. After setting boundary conditions, the solution of the patch linear system yields the required patch surface. In the rest of this section, we will describe the triangulation, linear system setup and our new type of constraint (our key contribution for the patch technology) in more detail.

In this section, a linear system that may be used for each patch, and a workflow which allows editing the boundaries and internal constraints of a patch, are described according to some embodiments. In overview, the following steps are described: projection of the patch to a 2D domain; triangulation; creation of a linear system; and the formulation of positional and normal constraints.

Triangulation

In some embodiments, input is a set of bezier curves defining the patch boundaries and internal constraints. For example, the teardrop outline shown in FIG. 24a, which may, for example, be created in a vector art tool and imported into the system, may be the input starting curve(s). Some embodiments may first approximate all input curves by polylines. By using the same approximations for each boundary curve, embodiments may ensure a consistent triangulation across patch boundaries and avoid troublesome T-junctions. Some embodiments may then take the closed polygon that defines the boundary of the patch, and use an algorithm, for example Newell's algorithm, to compute a plane of best fit. Newell's Algorithm is a 3D computer graphics procedure for elimination of polygon cycles in the depth sorting required in hidden surface removal. Note that other algorithms or techniques than Newell's algorithm may be used. Some embodiments may project the curves to this 2D domain for triangulation, using a triangulation technique to generate a high quality mesh provided that the input curves are close enough to the planar domain. In one embodiment, the triangulation technique may be configured to use a maximum area constraint to prevent rendering artifacts due to large triangles. Some embodiments may use the maximum area threshold as a quality parameter; a smaller value yields a denser, higher quality surface.

Solving for a Smooth Surface

Figure 18:
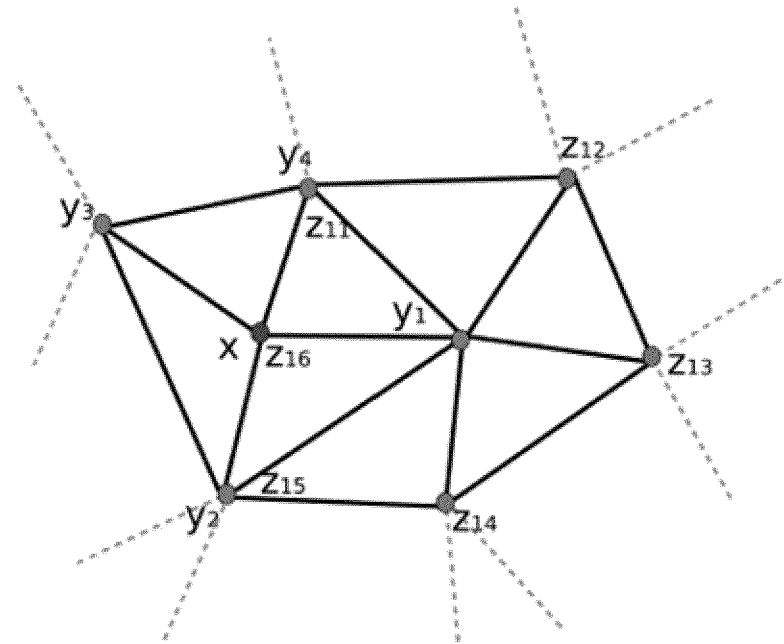
FIGS. 18 and 19 illustrate variables used in equations for solving for a smooth surface according to some embodiments.
Figure 19:
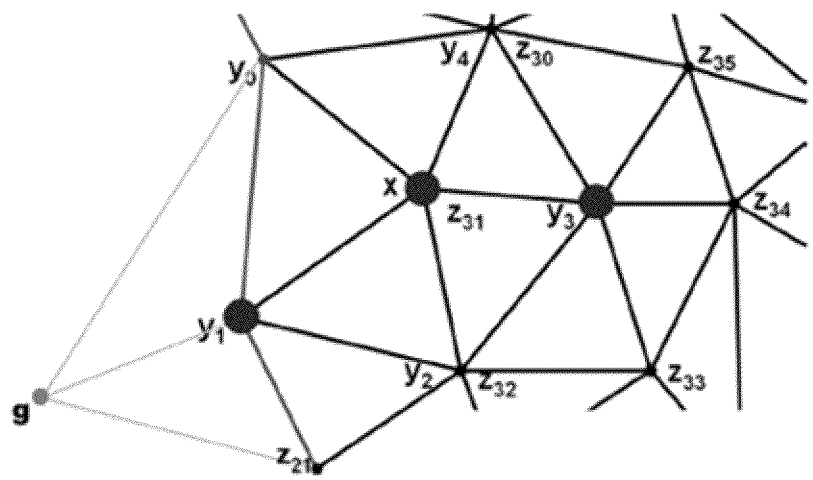

FIGS. 18 and 19 are used to illustrate variables used in the equations that follow. In FIG. 18, vertex x has neighbors $y_i$. Neighbors of vertex $y_1$ are labeled $z_{1j}$. In FIG. 19, vertex x has neighbors $y_0$, $y_1$ on the boundary, and neighbors $y_2$, $y_3$, $y_4$ in the interior with a full one-ring neighborhood. Each boundary vertex has its own ghost vertices and corresponding ghost triangles to artificially provide the required one-ring neighborhood. For example, $y_1$ has ghost vertex g.

Once a triangulation has been generated, the positions of the unconstrained vertices may be solved for, for example using a standard variational formulation of the biharmonic equation, or by some other technique. The result is a sparse set of equations where each free vertex is positioned to have a vanishing bi-Laplacian:

$$\Delta^2(x)=\Delta(\Delta x)=0 \qquad (10)$$

where the bi-Laplacian operator $\Delta^2$ is defined in terms of a discrete Laplacian operator. Specifically, the Laplacian at a mesh vertex is given by its one-ring neighborhood:

$$\Delta x = \Sigma_i w_i(x-y_i)$$

where $w_i$ are the cotangent weights scaled by inverse vertex area. Cotangent weights are computed in the planar domain and held constant to linearize the system. Using the variables illustrated in FIGS. 18 and 19, this system expands fully to:

$$\left(\sum_i w_i\right)^2 x - \left(\sum_i w_i\right)\left(\sum_i w_i y_i\right) - \sum_i w_i\left[\left(\sum_k w_{ik}\right)y_i - \sum_k w_{ik} z_{ik}\right] = 0 \qquad (11)$$

For this system to have a solution, some vertices in the system must be given a fixed position. These vertices are the position constraints. All boundary vertices are position constraints, and additional vertices inside the patch may be set as position constraints to provide artistic controls. The degree of smoothness demanded at position constraints may be changed, for example by blending the bi-Laplacian with a simpler Laplacian equation at vertices adjacent to the constraint.

Normal Constraints Using Ghost Vertices

The linear system described so far may not contain sufficient information near the boundary. The neighbors of the boundary vertices need a Laplacian for those boundary vertices. Since the boundary vertices do not have a full one-ring, the one-ring needs to be "completed" somehow to compute the Laplacian. Some embodiments may use "ghost vertices" across the boundary; ghost vertices are artificial vertices that may be used for setting up the linear system. In some embodiments, the ghost vertices may be used solely for completing the local one-ring neighborhoods of boundary vertices (independent of the one-ring neighborhoods of other boundary vertices) and are not actually added to the mesh.

FIGS. 20a through 20c illustrate a small patch with ghost vertices about the boundaries according to some embodiments. In some embodiments, vertices may be used across patch boundaries when smoothness at patch boundaries is required. However, actual vertices across the patch boundary may not be used, as these are solved by an independent linear system, and are thus not known. Instead, in some embodiments, ghost vertices are used. The ghost vertices may be generated by mirroring all edges incident to the boundary across the boundary line, as shown in FIGS. 20a through 20c.

By rotating these ghost vertices locally about their boundary line, the surface normals may be controlled, allowing for $G^1$ continuity across patch boundaries. This may allow embodiments to curve patch surfaces, for example to inflate surfaces as shown in FIGS. 24a and 24b and FIGS. 25a and 25b.

Figure 22:
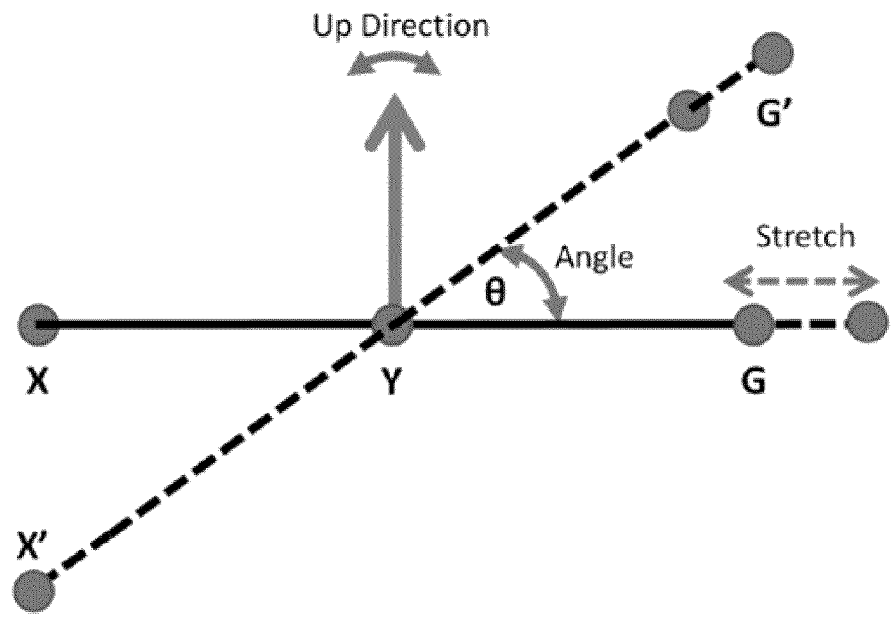
FIG. 22 shows various parameters that may be used to set the position of an internal vertex by moving a ghost vertex connected to a normal constraint, according to some embodiments.

FIG. 21 shows ghost vertices that may be used when computing the Laplacian of boundary vertex y from the perspective of internal vertex $x_1$ or internal vertex $x_2$, according to some embodiments. Vertices $x_1$ and $x_2$ are mirrored across vertex y to form ghost vertices $g_1$ and $g_2$, respectively. FIG. 22 shows various parameters that may be used to set the position of internal vertex X by moving the ghost vertex G connected to a normal constraint Y, according to some embodiments. The three parameters associated with the ghost vertex are the up direction, the angle made with respect to the up direction and the stretch introduced by the ghost vertex. After moving the ghost vertex to a new position G', the corresponding internal vertex X gets moved to position X' after the linear solve.

Referring to FIG. 21, internal vertices $x_1$ and $x_2$ are connected to a boundary vertex y. The positions are those of the flat (2D) mesh that lies on the best-fitting plane. By mirroring the vertex $x_1$ across the plane orthogonal to the edge $x_1$-y, a ghost vertex $g_1$ may be produced. While producing the bi-Laplacian equation (equation 11) for vertex $x_1$, the one-ring of y is completed by connecting the ghost vertex $g_1$ to the neighbors of y on the boundary. Similarly for vertex $x_2$, the one-ring of y is completed by connecting the ghost vertex $g_2$ to the neighbors of y on the boundary. That is, the vertex $x_1$ "sees" the ghost vertex $g_1$ and the vertex $x_2$ "sees" the ghost vertex $g_2$.

In the above formulation, a condition is set that the plane across which the internal vertex (e.g. $x_1$ in FIG. 21) is mirrored is orthogonal to the best fitting plane for the patch. However, for generating interesting N-sided patches with different tangent planes along the boundary, different planes across which the internal vertices are mirrored may need to be specified. A solution for doing so that may be used in some embodiments is to specify an "up direction" parameter at each boundary vertex (see FIG. 22). The mirrored ghost vertex is rotated so that the edge connecting the boundary vertex to the ghost vertex (e.g. y-$g_1$ in FIG. 21) is orthogonal to the up direction. If unspecified, the up direction may be assumed to be the normal of the best-fitting plane of the patch.

After placing the ghost vertices in their proper 3D positions, a mesh has been generated with complete Laplacians everywhere. Embodiments may then formulate equation 11 for all the un-constrained mesh vertices and move the known vertex positions (including ghost vertex positions) to the right-hand-side. A sparse, symmetric and positive-definite linear system of the form Ax=b may thus be obtained, which may then be factored and solved.

By rotating the ghost vertices locally about their boundary line, embodiments may control the surface normal, allowing for $G^1$ continuity across patch boundaries. This editing allows embodiments to curve the patch surfaces, for example to inflate surfaces as shown in FIGS. 24a and 24b and FIGS. 25a and 25b.

Some embodiments may also use ghost vertices for constraints inside the patch to control the surface normal along the constraints lines. The formulation remains the same as for the boundary vertices: the constraint vertex stores an up direction and every neighbor of the constraint vertex uses a ghost vertex for completing the Laplacian of the constraint vertex. In some embodiments, a set of ghost vertices may be generated for each side of a constraint line. For example, when computing the bi-Laplacian of a vertex on the left side of a constraint line, mirrored ghost vertices on the right side of the constraint line may be used. When computing the bi-Laplacian of a vertex on the right side of the line, the mirrored ghost vertices on the left of the line are used.

Via the up direction, the ghost vertices offer a method of exactly specifying the tangent planes at all constraint vertices. The vertices where such directions and ghost vertices are specified are called normal constraints. Some embodiments may require that all normal constraints have constrained positions and are therefore also position constraints. All vertices on the boundary are normal constraints.

By moving ghost vertices farther from or closer to a constraint line, embodiments can change the magnitude of the tangent at the constraint point. This produces a lateral motion of the vertices near the constraint point and effectively allows embodiments to change the area of the surface affected by the normal constraint. This parameter may be referred to as "stretch"; when stretch is zero, the length of the edge connecting the normal constraint to the ghost vertex is the same the length of the edge connecting the normal constraint to the corresponding internal constraint. Some embodiments may allow the stretch parameter to be specified for all normal constraints, including internal constraints. Some embodiments may use stretch in combination with ghost vertices to give additional control of the shape of a surface. By moving ghost vertices further from or closer to a constraint line, stretch may be intentionally introduced. This stretch effectively changes the magnitude of the tangent at the constraint point. This effect is demonstrated in cross section in FIGS. 23b and 23d.

Figure 23A:
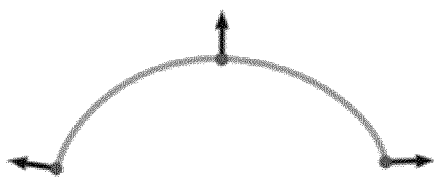
FIGS. 23a through 23d illustrate a cross section view of applications of constraint types according to some embodiments.
Figure 23B:
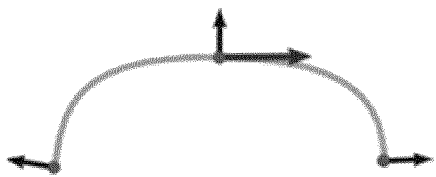
Figure 23C:
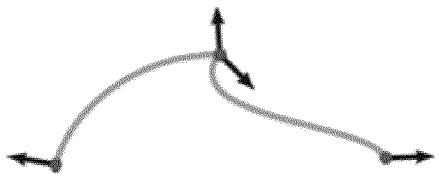
Figure 23D:
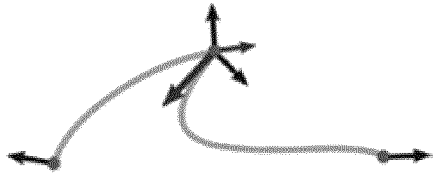

FIGS. 23a through 23d illustrate a cross section view of applications of constraint types according to some embodiments. By controlling normals and positions, embodiments may control patch shape as shown in cross section in FIGS. 23a through 23d. Position and normal constraints establish a smooth surface, as shown in FIG. 23a. Tangent magnitudes control the region of influence for each normal, as shown in FIG. 23b. A crease may be formed by setting a different normal on each side of a constraint line, as shown in FIG. 23c, and all these controls together may provide the control to add a "cresting wave" shape to the teardrop, as shown in FIG. 23d.

Modifying a Surface with Ghost Vertex Parameters

After the patch has been constructed and solved, embodiments may obtain a surface that interpolates the position and tangent plane at all normal constraints and interpolates the position constraints. This surface may be modified by varying the parameters stored at the constraints—these modifications result in a new right-hand-side of the linear system, and a new solution (i.e. modified surface) may be obtained interactively, for example by using a simple back-solve. The following describes the types of shape changes that may be created by modifying ghost vertex parameters.

FIG. 22 shows the parameters associated with the ghost vertex that can be used to modify the surface. The surface can be inflated by increasing the angle made by the edge connecting the ghost vertex to the normal constraint. The stretch parameter controls the amount of influence the normal constraint has on the surrounding surface. Some embodiments may provide a user interface in which the up direction is used only during patch construction—this parameter may be kept fixed after patch initialization, and the angle parameter may be used to interactively change the surface normal near the normal constraint.

In embodiments, the quality of the surface is not affected by the number of sides, holes or internal constraints in the patch. Embodiments may offer an intuitive set of control parameters for changing the shape of the surface near constraint curves.

Editing Examples Using Single Patches

FIGS. 24a through 24f and FIGS. 25a through 25e illustrate a range of edits that are possible with single patches, according to some embodiments.

FIGS. 24a through 24f show an example of editing a single patch according to some embodiments. The outline of a teardrop is imported as a patch boundary and tessellated (e.g., triangulated), while also generating ghost vertices on the boundary, as shown in FIG. 24a (enlarged to show details of the tessellation). The normals on the boundary are rotated to give a 3D teardrop shape, as shown in FIGS. 24b and 24c. A closed internal constraint line defines a portion of the 3D teardrop shape, for example to be clipped from the shape, as shown in FIG. 24d. An open internal constraint line defines the crest of a wave the user would like to add to the surface of the teardrop, as shown in FIG. 24e. By setting the normals and tangent magnitudes, a wave is added to the teardrop surface, as shown in FIG. 24f.

Figure 25A:
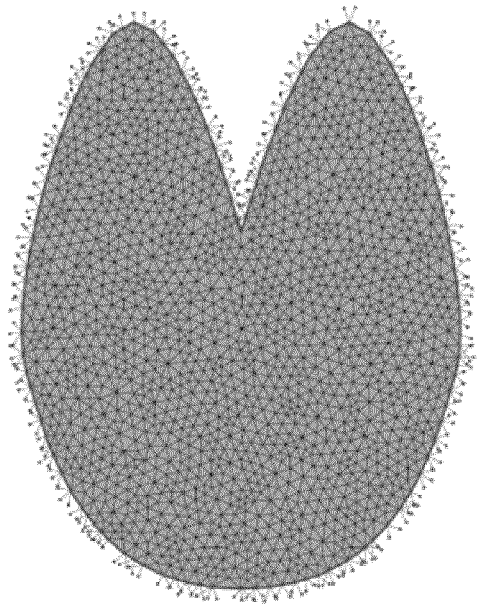
FIGS. 25a through 25e show another example of editing a single patch, and illustrate a range of edits that are possible with single patches, according to some embodiments.
Figure 25B:
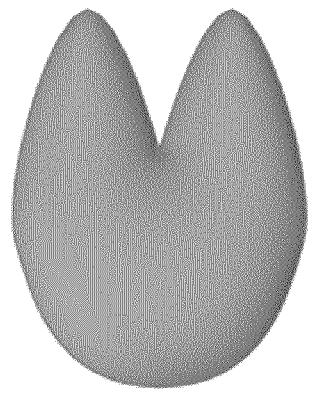
Figure 25C:
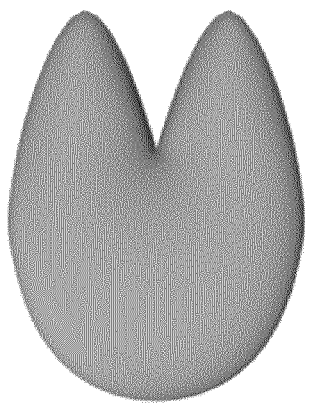
Figure 25D:
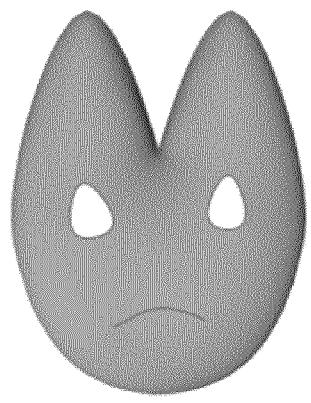
Figure 25E:
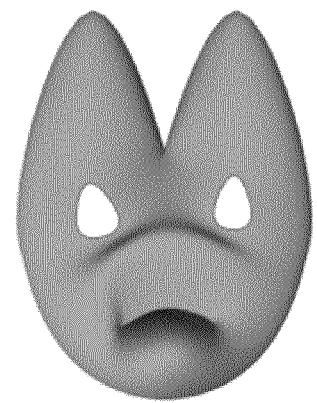

FIGS. 25a through 25e show another example of editing a single patch according to some embodiments. The outline of the shape is imported as a patch boundary and tessellated (e.g., triangulated), while also generating ghost vertices on the boundary, as shown in FIG. 25a (enlarged to show details of the tessellation). By specifying the same angle for the normal constraints on the boundary, an inflated shape is generated, as shown in FIG. 25b. By specifying a different angle on the lower boundary vertices, the surface is made to curve over itself, as shown in FIG. 25c. At any time, internal constraints may be added, such as lines or holes, as shown in FIG. 25d. By rotating the surface around the internal normal constraint line and increasing its stretch parameters, a deep groove may be added to the surface, as shown in FIG. 25e.

Constructing 3D Patches from Curves

Various embodiments of user interface workflows and/or methods for producing complex 3D models are described. Embodiments of the variational N-sided patch technique described herein may be implemented in surface modeling systems and used as a basis for these workflows and methods. However, it is to be noted that, while the variational N-sided patch technique is used for all examples, at least some of these workflows and methods may be used in surface modeling systems that employ other techniques than the variational N-sided patch technique described above. Furthermore, the following descriptions are not intended to provide specific user interface specifications, but instead describe the underlying technology that may be used as a basis for a user interface for modeling 3D surfaces.

Drawing a 2D sketch of a smooth object may be easier than building that object in a 3D modeling tool. With that in mind, workflows or methods for easily converting an existing sketch to a 3D model are provided. While the discussion focuses on sketches of objects that are mostly smooth, but that have some sharp features, sketches of other complexities and compositions may also be converted to 3D models using embodiments. In some embodiments, the input to the system is a vector art file that specifies paths (for example, Bezier curves) that make up the sketch. Some embodiments may require that all the paths are bounded by one closed path. Some embodiments may require that paths do not intersect other than at endpoints. Some embodiments may sample the input curves and convert them into piece-wise linear connected segments, i.e. polylines. By using the same approximations for each boundary curve, embodiments may ensure a consistent triangulation across boundaries of patches that may share a polyline and avoid troublesome T-junctions. For each patch, the outer-most bounding polyline may be specified by the user as the boundary for the patch. In some embodiments, all of the internal polylines (which may be open or closed) may be specified as normal constraints for that patch. In some embodiments, the user may change the type of any of the constraints at any time.

Figure 26A:
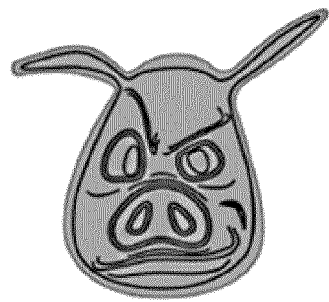
FIGS. 26a through 26f illustrate inflating and sculpting a single patch according to some embodiments.
Figure 26B:
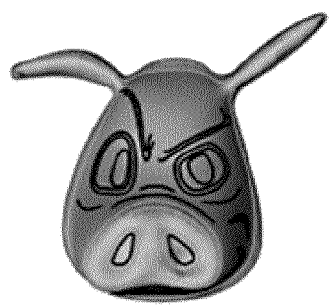
Figure 26C:
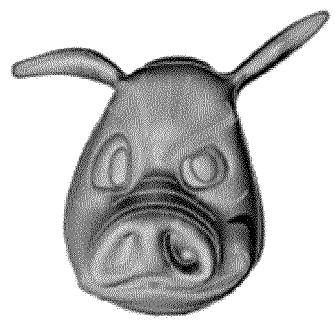
Figure 26D:
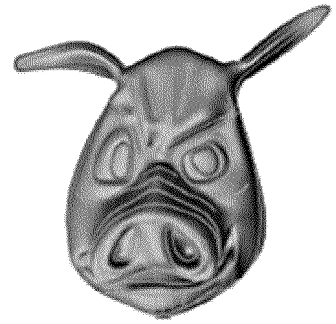
Figure 26E:
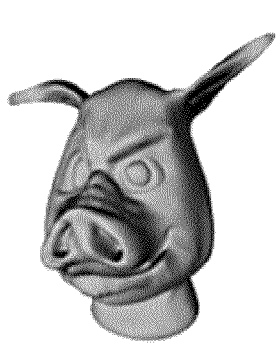
Figure 26F:
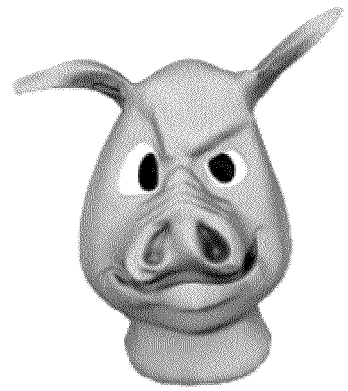

FIGS. 26a through 26f illustrate inflating and sculpting a single patch, according to some embodiments. In FIG. 26a, the user starts with a sketch and inactivates all internal constraints (shown as black lines). By activating and moving some constraints, the desired 3D positions of the inactive constraints is obtained, as shown in FIG. 26b. Normal constraints (dark gray lines) are used to define the eyes, and additional constraint lines (light gray lines) are added on the 3D surface for more control, as shown in FIG. 26c. The final states of the constraints (FIG. 26d) yields the surface (FIG. 26e) which then may be shaded and rendered (FIG. 26f).

Inactive Constraint Curves

A challenge in 3D modeling from a 2D sketch is to convert existing 2D curves into 3D space curves. As a solution, some embodiments may deactivate at least some interior constraints when converting existing 2D curves into 3D space curves. An inactive constraint is essentially a passive curve that stays on the surface and that gets modified along with the surface when the surface is inflated, but that does not affect the surface itself. By changing parameters stored at the active constraints, embodiments may modify the surface and turn the inactive constraints from flat 2D curves into 3D space curves. The inactive constraints can be activated at any time when their 3D shape meets the user's expectations. See FIGS. 26a through 26f for an example of inactivating internal constraint curves during inflation of a 2D surface, particularly FIGS. 26a and 26b. Since drawing smooth curves in 3D space is more difficult than drawing smooth curves in 2D, leveraging the patch inflation mechanism by inactivating (initially 2D) internal constraint curves during inflation of a surface provides a relatively easy way to produce 3D constraint curves for the inflated surface. The patch inflation mechanism may, for example, be implemented according to an embodiment of the variational N-sided patch technique described herein, or alternatively according to other techniques than the variational N-sided patch technique.

The inactive constraint curves do not affect the surface inflation. The inactive constraint curves behave as if they are glued on the surface and are modified accordingly as the surface is inflated, but the inactive constraint curves do not participate in any linear solves during the inflation. However, embodiments may generate a polygon (e.g., triangle) mesh for the 2D surface (see, e.g., FIGS. 24a and 25a) prior to surface inflation. While inactive constraint curves do not affect inflation of the surface, they do affect the tessellation of the surface. The triangle mesh is generated keeping in mind that these inactive constraint curves are present; some polygon edges in the mesh may be aligned with the inactive constraint curves. When an inactive constraint curve is later activated during or after inflation, the surface should not be affected by the activation. In order to achieve this, the tessellation process needs to have included the inactive constraint curves when doing the initial tessellation.

Figure 27:
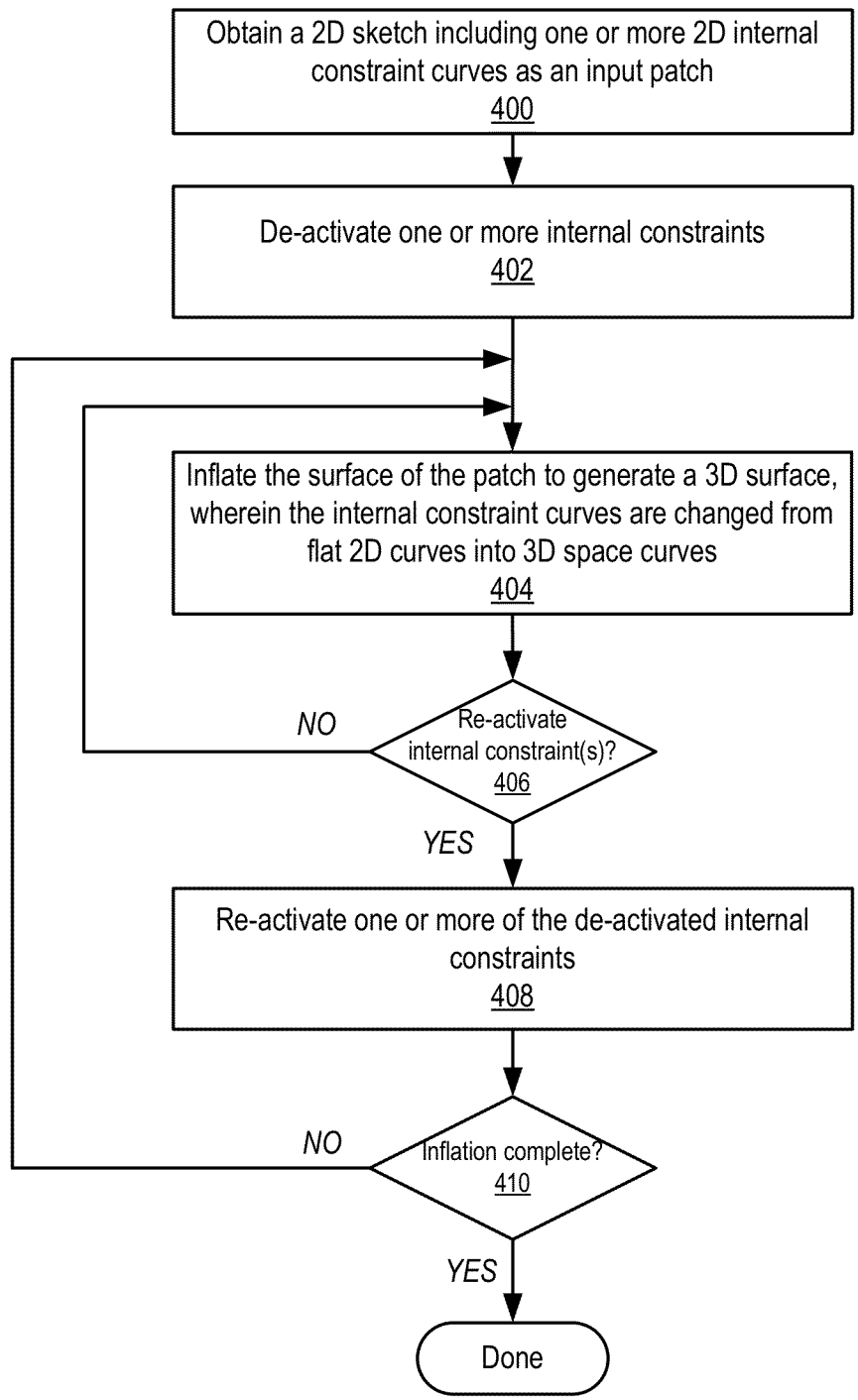
FIG. 27 illustrates a method for inflating a single patch including internal constraints according to some embodiments.

FIG. 27 illustrates a method for inflating a single patch including internal constraints according to some embodiments. As indicated at 400, a 2D sketch including one or more 2D internal constraint curves may be obtained as an input patch. For example, the user may use some graphics tool to draw a 2D sketch of an object and to draw the one or more 2D internal constraint curves. The internal constraint curves may include open curves, closed curves, or both. See FIG. 26a for an example. As indicated at 402, one or more internal constraint curves may be deactivated. The deactivation of internal constraint curves may be performed automatically, or according to user input. That is, the user may interactively choose to deactivate one or more internal constraint curves, while possibly leaving other internal constraint curves active. While not shown, the surface may be tessellated to generate a polygon (e.g., triangle) mesh; the inactive constraint curves are considered when tessellating the surface. As indicated at 404, the surface of the patch may be inflated to generate a 3D surface. By changing parameters stored at the active constraints, embodiments may modify the surface and turn the inactive constraint curves from flat 2D curves into 3D space curves. The internal constraint curves are changed from flat 2D curves into 3D space curves without the internal constraints associated with the curves affecting the inflation of the surface; the internal curves are turned into 3D space curves conforming to the inflated surface, with the surface being inflated according to the active constraints.

At 406, if one or more of the internal constraints are to be reactivated, then the specified one or more internal constraints are reactivated, as indicated at 408. Otherwise, inflation continues if not complete at 410. This reactivation may occur automatically if inflation of the patch is complete, and/or in response to user input during inflation or after inflation is complete. Inactive constraints may be interactively activated at any time during inflation when their 3D shape meets the user's expectations. Thus, the user may choose to reactivate one or more of the internal constraint curves during inflation, allowing the user to selectively control inflation of the surface according to specific internal constraints.

The above describes deactivating and reactivating constraints during surface inflation. However, a similar technique of deactivation and reactivation of constraints may be implemented in other methods of surface manipulations or operations that deform the surface, or an area of the surface. In general, one or more constraints may be deactivated before or during the application of any method for deforming the surface. The method may be performed with the inactive constraints not involved in at least some surface calculations performed by the method. The deactivated constraints may be activated during the method and/or after the method is performed. However, the surface deformation method should respect any active constraint positions and/or normals in performing the surface deformation.

Decomposing a Patch into Multiple Patches

In some embodiments, the user may add additional constraints to an existing, inflated patch. Eventually, a single patch may not be sufficient to construct the desired shape. At that stage, the user may choose to decompose the single patch into multiple, disjoint, and possibly abutting patches. To do so, some embodiments may provide methods and workflows for incrementally breaking apart a single patch into two or more separate patches. In some embodiments, the user selects a constraint curve and indicates to the system via a user interface to make a separate patch with the constraint curve as the boundary. If the constraint curve is closed, it is turned into a hole in the original patch. If the constraint curve is not closed, the system closes the curve, for example by connecting its endpoints with a line segment. In some embodiments, the constraint curve may be automatically removed from the original patch. The 3D position and up direction required for every point along the boundary of the new patch may be taken from the original patch surface. The new patches may be edited independent of the original patch and may be further decomposed into more patches. See FIGS. 28a through 28d for an example of patch decomposition to create several free floating patches, and FIGS. 29a through 29d for an example of decomposing a patch into several smaller patches for the purpose of adding more detail.

Figure 28A:
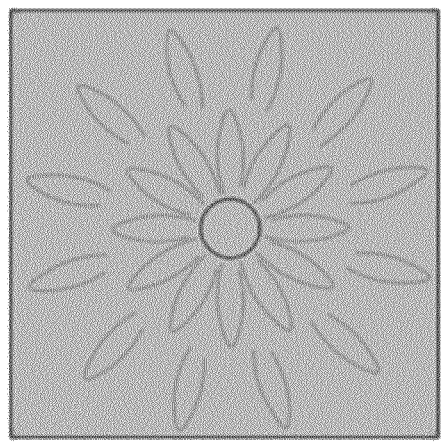
FIGS. 28a through 28d show an example of patch decomposition to create several free floating patches, according to some embodiments.
Figure 28B:
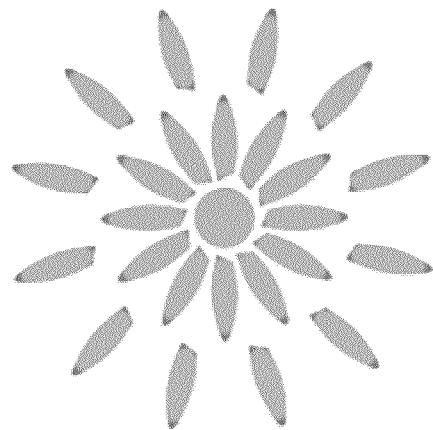
Figure 28C:
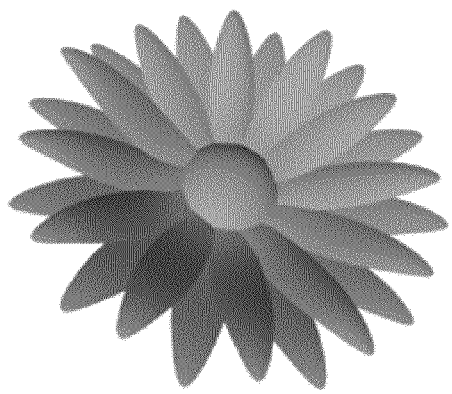
Figure 28D:
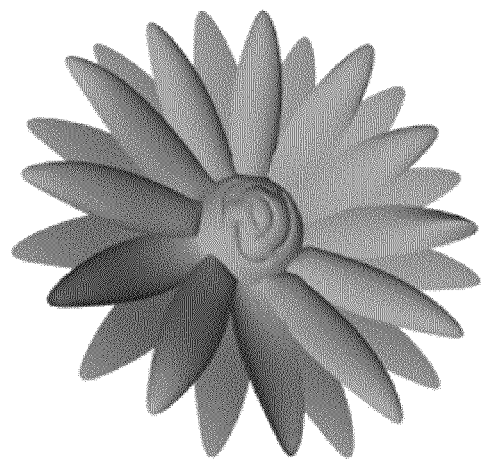

FIGS. 28a through 28d show an example of patch decomposition to create several free floating patches, according to some embodiments. As illustrated in FIG. 28a, the user produces the different sketch components in a 2D drawing. Each sketch component is made into a new N-sided patch by the system, as illustrated in FIG. 28b. The template rectangle from which the N-sided patches were "cut" may be discarded. By deforming the patch boundaries, the different patches may be joined together to form a flower, as illustrated in FIG. 28c. Further edits can be directly added on the 3D surface of each patch, as illustrated in FIG. 28d.

Figure 29A:
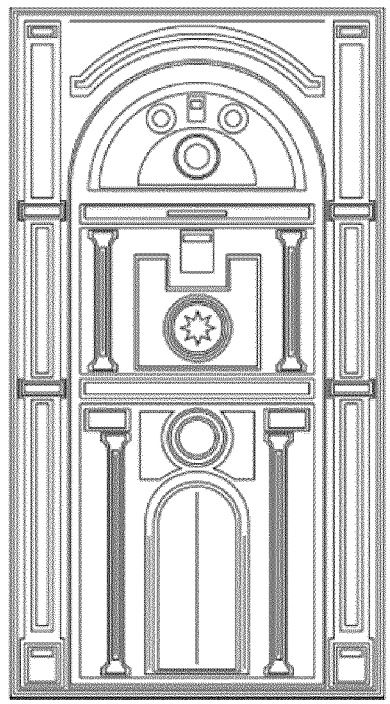
FIGS. 29a through 29d illustrate making multiple patches from a single patch, according to some embodiments.
Figure 29B:
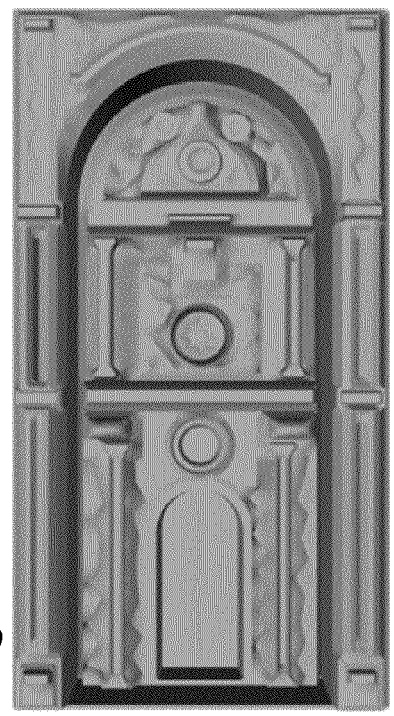
Figure 29C:
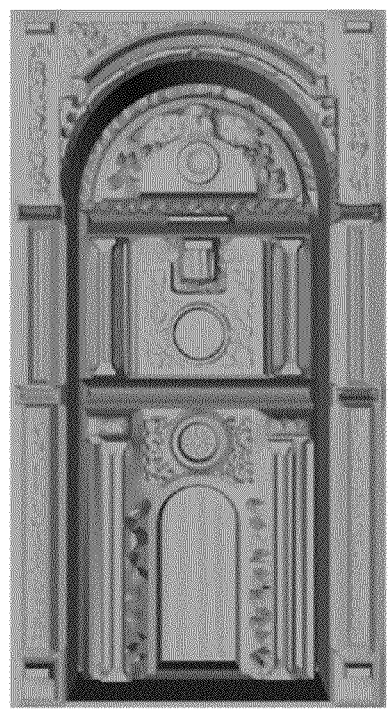
Figure 29D:
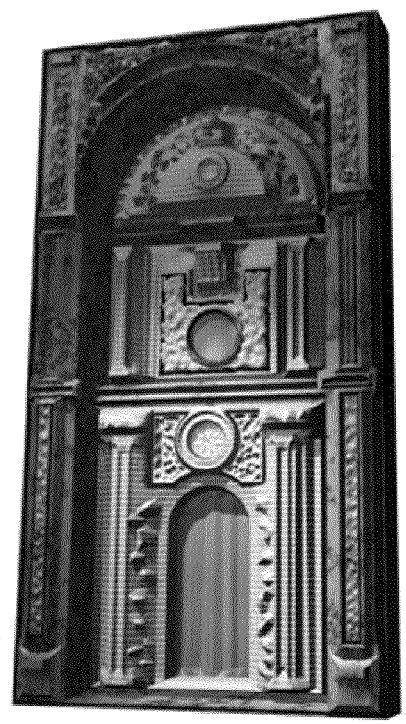

FIGS. 29a through 29d illustrate making multiple patches from a single N-sided patch, according to some embodiments. In FIG. 29a, the system makes a single patch out of the 2D sketch of a door. By editing parameters (e.g., position and angle) at internal constraints, the user inflates the patch using the system to make a 3D model, as shown in FIG. 29b. In FIG. 29c, in order to add more detail, internal constraint curves, such as selected internal faces (e.g., along the side panels) are made into separate patches and edited by drawing additional normal constraint curves. FIG. 29d shows an example image that may be rendered from FIG. 29c. Thus, the user can specify a closed constraint that is part of a larger patch and specify that the closed constraint is to be made into a patch. The system generates an N-sided patch from the specified constraint. This allows the user to add additional details in the new patch that would be difficult to add to the original patch.

Figure 30:
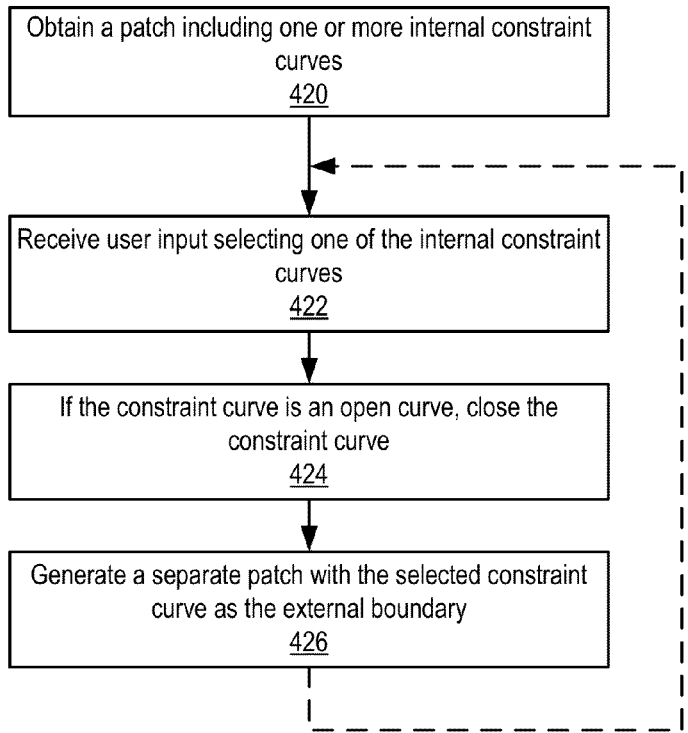
FIG. 30 illustrates a method for making separate patches from internal constraints according to some embodiments.

FIG. 30 illustrates a method for making separate patches from internal constraints according to some embodiments. As indicates at 420, a patch including one or more internal constraint curves may be obtained. The patch may be an uninflated 2D patch (a two-dimensional patch representation of a surface), an inflated 3D model (a three-dimensional patch representation of the surface), or a partially inflated patch. As indicated at 422, user input selecting one of the internal constraint curves may be received. As indicated at 424, if the constraint curve is an open curve, the constraint curve may be closed, for example by connecting its endpoints with a line segment. As indicated at 426, a separate patch with the selected constraint curve as the external boundary may be generated. Note that the original (surface) patch may be modified according to the external boundary of the new patch. The method of FIG. 30 may be repeated for other internal constraint curves in the original patch and/or for internal constraint curves in the newly-created patch. The user may then add additional details (e.g., constraint curves) in the new patch(es) as desired, separately inflate the new patch(es) and the surface patch, and in general modify the separate patch and the internal patch(es) separately.

An alternative approach for decomposing the patch into multiple patches that may be used in some embodiments is to allow the user to discard the external patch surface, leaving behind only the internal constraint curves, as shown in FIGS. 28a and 28b. The constraint curves may then each be converted into a separate patch. In some embodiments, the user may connect edges to create a network of closed constraint curve loops, if necessary. For every loop among the constraint curves, the system automatically generates a respective patch.

Figure 31:
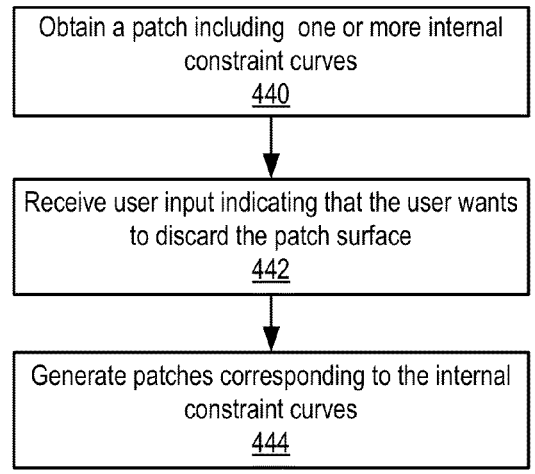
FIG. 31 illustrates another method for making separate patches from internal constraints according to some embodiments.

FIG. 31 illustrates another method for making separate patches from internal constraints according to some embodiments. As indicated at 440, a patch including one or more internal constraint curves may be obtained. The patch may be an uninflated 2D patch, an inflated 3D model, or a partially inflated patch. As indicated at 442, user input indicating that the user wants to discard the external patch surface may be received via a user interface. The patch surface may be discarded, and, as indicated at 444, patches corresponding to the internal constraint curves may be generated. In some embodiments, the user may connect edges to create a network of closed constraint curve loops, if necessary. For every loop among the constraint curves, the system automatically generates a respective patch.

Decomposing a single patch into multiple patches may provide several advantages. Performing shape edits on the new patch is an easy way of ensuring local control of those edits. The user gets local control over the shape being modeled; adding or manipulating the constraints on one patch may not affect other patches. Decomposing the model into multiple patches also has computational advantages: the locality of patch edits means that only the affected patch needs to be updated. Even if multiple patches are being affected and need to be updated, embodiments may perform parallel computation, one that may scale well in computer systems that provide parallel processing.

Some embodiments may provide one or more user interface elements that allow a user to selectively cut-and-paste a constraint curve from one location of a model or patch to another location to thus create a copy of the constraint curve at the new location. For example, a user may interactively select an internal constraint curve, select a "copy" option, specify another location on the surface, and "paste" a copy of the selected internal constraint curve to that location.

Generating Patches by Sketching on a 3D Reference Surface

Many three-dimensional (3D) shapes can be thought of, in an abstract sense, as compositions of a few simple 3D geometric shape primitives. Some embodiments may provide a workflow for converting such simple shape primitives into one single, smooth surface. Some embodiments may allow the user to create one or more variational N-sided patches from closed curves drawn on a 3D reference shape. The 3D positions and normals of the reference shape at the intersection with the curve provide the necessary boundary conditions for the new patch. This method is an easy way of producing a complex surface with varying boundary normals by drawing on top of a 3D shape.

In embodiments, the user draws a closed curve on a 3D surface; the drawn outline is taken as a boundary for an N-sided patch. If the user does not close the curve, the system may automatically close the curve, as a closed outer boundary curve may be required to produce an N-sided patch. The 3D surface being drawn on may be any 3D surface; it does not have to be a surface created using the N-sided patch technology. The boundary conditions, the positions, and the surface normals at the boundary are inferred automatically from the 3D surface that the user has drawn the curve on. As the user draws on the curved canvas, the position and the surface normals at some or all points on the curve are determined from the 3D surface and stored by the system. The stored information may then be passed to the variational N-sided patch technology to generate the patch.

Figures 32A, 32B, 32C:
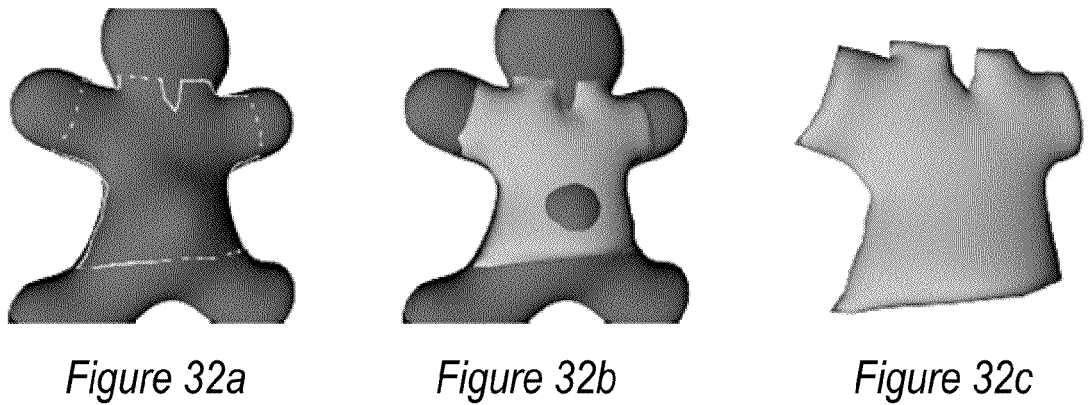
FIGS. 32a through 32c illustrate producing a complex surface with varying boundary normals by drawing on top of a 3D shape, according to some embodiments.

FIGS. 32a through 32c show an example of drawing on a 3D surface to create a variational N-sided patch, according to some embodiments. In FIG. 32a, curves are drawn on a 3D reference surface to produce a 3D space curve for bounding the desired patch. In FIG. 32b, upon making the patch, the new surface smoothly interpolates the reference surface, but only along the boundary curve; bumps in the reference surface that are not captured by the polyline are not present in the mesh. In FIG. 32c, after making the patch, the reference surface can be discarded, leaving behind only the surface patch for future editing. In some embodiments, if the user does not close the curve, the system may automatically close the curve for them.

Figure 33:
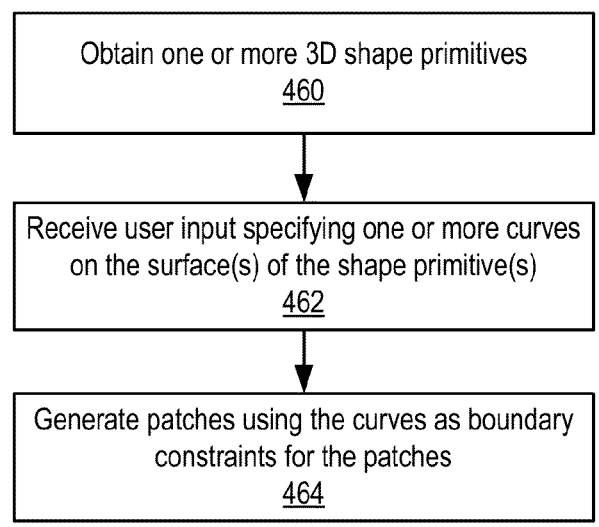
FIG. 33 illustrates a method for converting 3D shape primitives into a surface, according to some embodiments.

FIG. 33 illustrates a method for converting 3D shape primitives into a surface, according to some embodiments. As indicated at 460, one or more 3D shape primitives may be obtained. The input to the system is a 3D shape, such as a simple 3D shape (e.g., a sphere, cone, cylinder, or torus) or a composition of such simple shapes. Such composite shapes may be easy for a user to model. As indicated at 462, user input specifying one or more curves on the surface(s) of the shape primitive(s) may be received. Embodiments may allow the user to draw curves on the simple shapes. As indicated at 464, one or more patches may be generated using the curves as boundary constraints for the patch(es). The curves input by the user may be automatically inferred as the boundary constraints necessary to create the variational N-sided patch or patches. The boundary curves for the same patch may have been drawn on different shape primitives, thereby allowing embodiments to smoothly blend between these primitives.

In some embodiments, boundary curves for the same patch may be drawn on different shapes. In these embodiments, multiple 3D shapes may be used as the template or canvas on which the user draws curves from which a patch is to be generated. The user may first draw a curve or portion of a curve on one 3D shape. The 3D object may be replaced with a different 3D shape, and the user may continue to draw the curve on the surface of the new 3D shape. At each point that the user draws on the canvas, the surface position, tangent, and normal are recorded. The canvas can be replaced with a different shape, and the user can continue drawing. For example, the user may want to create a patch, a portion of which is part of a cylinder and the rest of which is part of a sphere. The user may draw a curve on a cylinder shape to generate a first portion of the patch, replace the cylinder a sphere shape, and complete drawing the curve.

Specifying $G^1$ Continuity Between Patches

In some embodiments, the up direction parameter stored in the normal constraint curve of a patch boundary determines the tangent plane of the surface at the boundary. Therefore, in order to maintain tangent plane ($G^1$) continuity across boundaries of abutting patches, embodiments may ensure that the "up" directions along the boundary points match across the boundary. Because changing the "up" direction is equivalent to changing the boundary conditions, this may be implemented in some embodiments by simply changing the boundary conditions. Patches with matching positions and up directions at boundary points will automatically be $G^1$ continuous at those points. Suppose the user is editing the position, angle and stretch parameters for the boundary constraints of one patch and wishes the neighboring patches to also deform to maintain $G^1$ continuity. In that case, the position, angle and stretch parameters of the corresponding boundary constraint of the other patches can be made to match. Embodiments may thus maintain patch continuity interactively.

Figure 34:
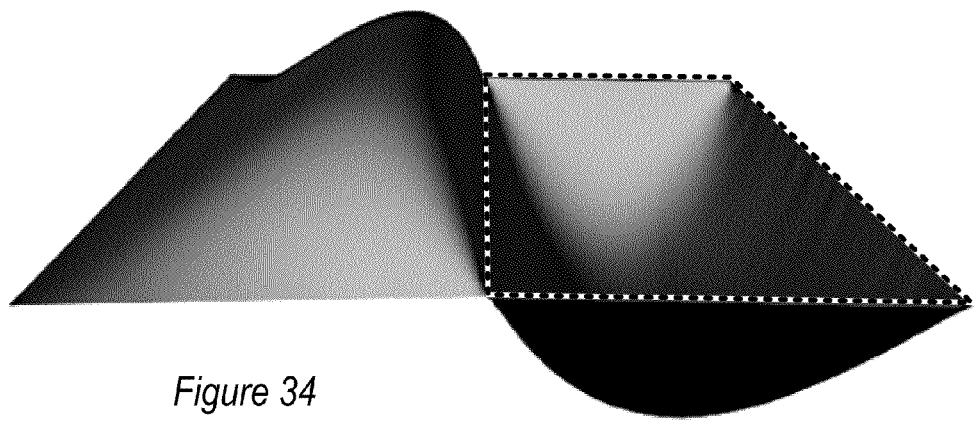
FIG. 34 illustrates maintaining $G^1$ continuity between patches, according to some embodiments.

FIG. 34 illustrates maintaining $G^1$ continuity between patches, according to some embodiments. In FIG. 34, the angle and stretch parameters for the patch bounded by the curve indicated by the dashed line are modified. In order to maintain continuity, the angle and stretch parameters for shared boundary constraints of the neighboring patch are also modified. The system may identify boundary constraints for two or more patches connected to each other. If the user changes the surface normals on one constraint, the surface normal(s) for one or more other constraints will be changed accordingly. However, the patches, for example the two patches in FIG. 9, are separately solved as isolated systems.

Figure 35A:
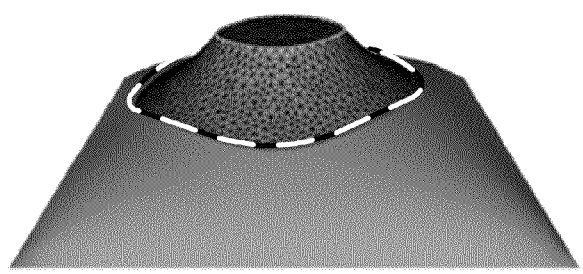
FIGS. 35a through 35c further illustrate maintaining $G^1$ continuity between patches, according to some embodiments.
Figure 35B:
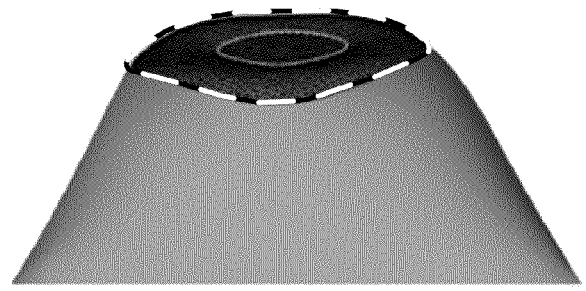
Figure 35C:
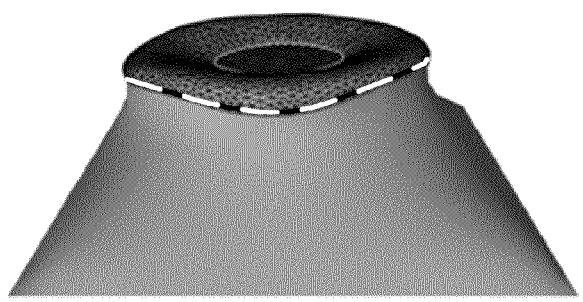

In addition, a user may want to break the tangent continuity. Some embodiments may thus allow the user to change the angle parameter and vary the surface only along one side of a boundary. See FIGS. 35a through 35c for an example. In FIGS. 35a through 35c, the dashed line curve is the boundary separating two patches, one shown in wireframe, the other without wireframe. If the user wishes to break the tangent continuity, embodiments can change the angle parameter and vary the surface only along one side of the boundary.

Note that the abutting patches constructed according to the method described above under Sketching on a 3D Surface will automatically have $G^1$ continuity since their "up" direction is set by the normal to the surface, and the normal for coincident constraint points should be the same.

Implementations

Figure 36:
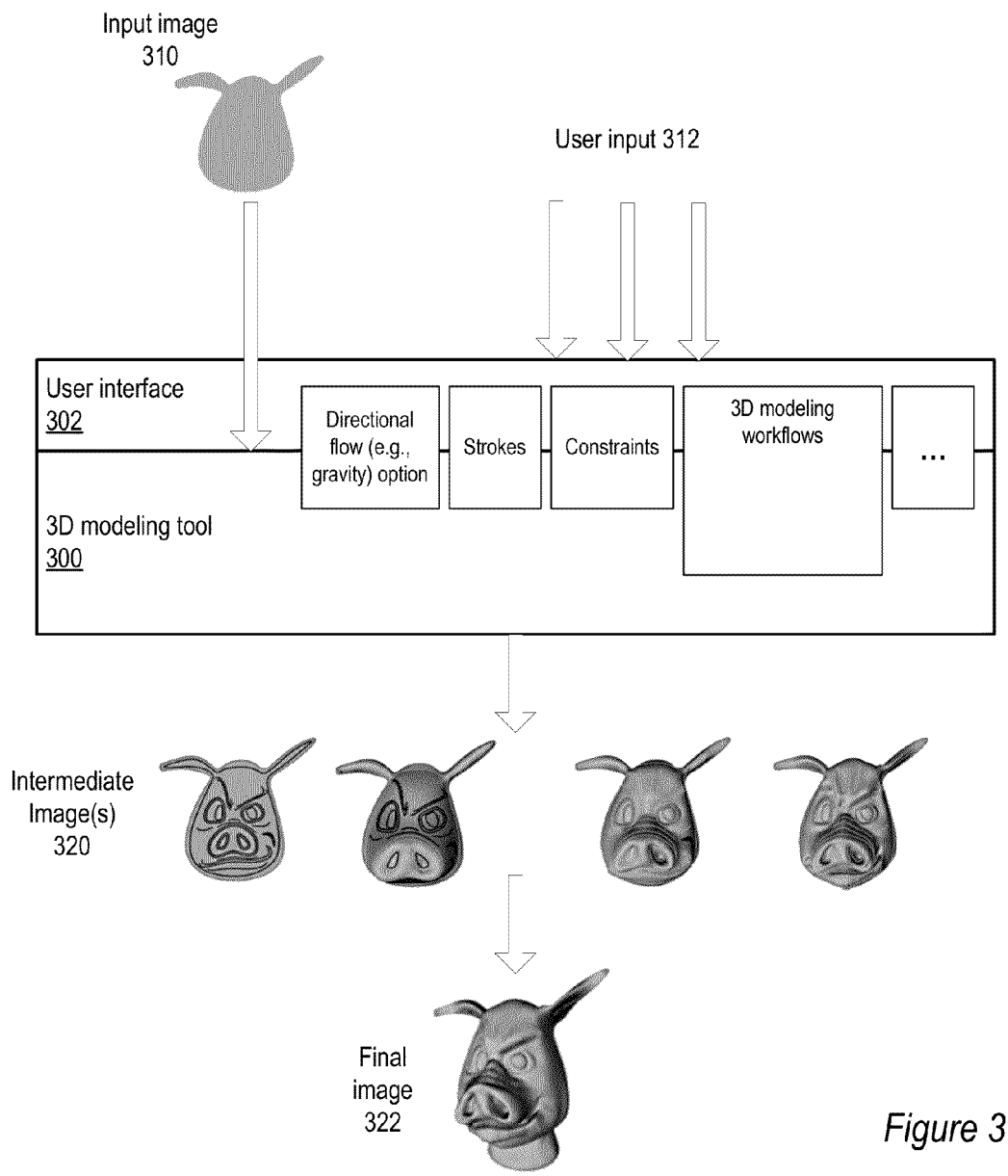
FIG. 36 illustrates an example embodiment of a 3D modeling tool.

FIG. 36 illustrates an example embodiment of a 3D modeling tool that may implement a surface inflation technique or tool as described herein and that may implement one or more of the workflows and methods for modeling 3D shapes from 2D curves as described herein, for example as illustrated in FIGS. 3, 6, 27, 30, 31 and 33. Applications of the 3D modeling tool 300 may include one or more of, but are not limited to, font design, stroke design, enhancing photographs, and modeling 3D shapes from scratch. Some embodiments of the 3D modeling tool 300 may be implemented, for example, as a plug-in for 2D art design tools such as Adobe® Illustrator® and GNU Gimp. Other embodiments may be otherwise implemented, for example as a stand-alone program or utility.

3D modeling tool 300 may provide a user interface 302 that provides one or more textual and/or graphical user interface elements, modes or techniques via which a user may enter, modify, indicate or select images, or regions of images, to be inflated (represented by input image 310), enter, modify, or select position constraints, select a gravity option or similar arbitrary directional flow option, input or draw strokes into shapes, images, or regions of digital images, specify or modify smooth or sharp position and boundary constraints including mean curvature constraints and surface normal constraints, specify pixel-position constraints, deactivate and reactivate constraints before, during, or after inflation, select internal constraints for which separate patches are to be generated, selectively discard a patch surface, draw constraint curves on geometric shape primitives, change the angle parameter and vary the surface only along one side of a boundary, cut-and-paste a constraint from one location on a surface to another location to thus make a copy of the constraint at the new location, and in general provide input to and/or control various aspects of surface inflation and 3D modeling as described herein using embodiments of a 3D modeling tool 300 as described herein. Note that a 3D modeling tool 300 may implement one or more of these features, may implement subsets of these features or all of these features, and may implement other features not listed as well. In some embodiments, 3D modeling tool 300 may provide real-time or near-real-time feedback to the user via dynamic display on a display device(s) of modifications to the target image 310 made according to the user input via user interface 302. Thus, the user may make additional input or manipulation of the image or shape using the 3D modeling tool 300, as illustrated by example intermediate image(s) 320. Results are output as the example final image 322. Final image 322 (as well as intermediate image(s) 320) may be displayed on a display device, printed, and/or written to or stored on any of various types of memory media, such as storage media or storage devices. (Also see FIGS. 24a-24f, 25a-25e, 26a-26f, 28a-28d, 29a-29d, 32a-32c, 34, and 35a-35c for other examples of user input and manipulation of patches and constraints that may be implemented in embodiments of a 3D modeling tool 300).

Example System

Figure 37:
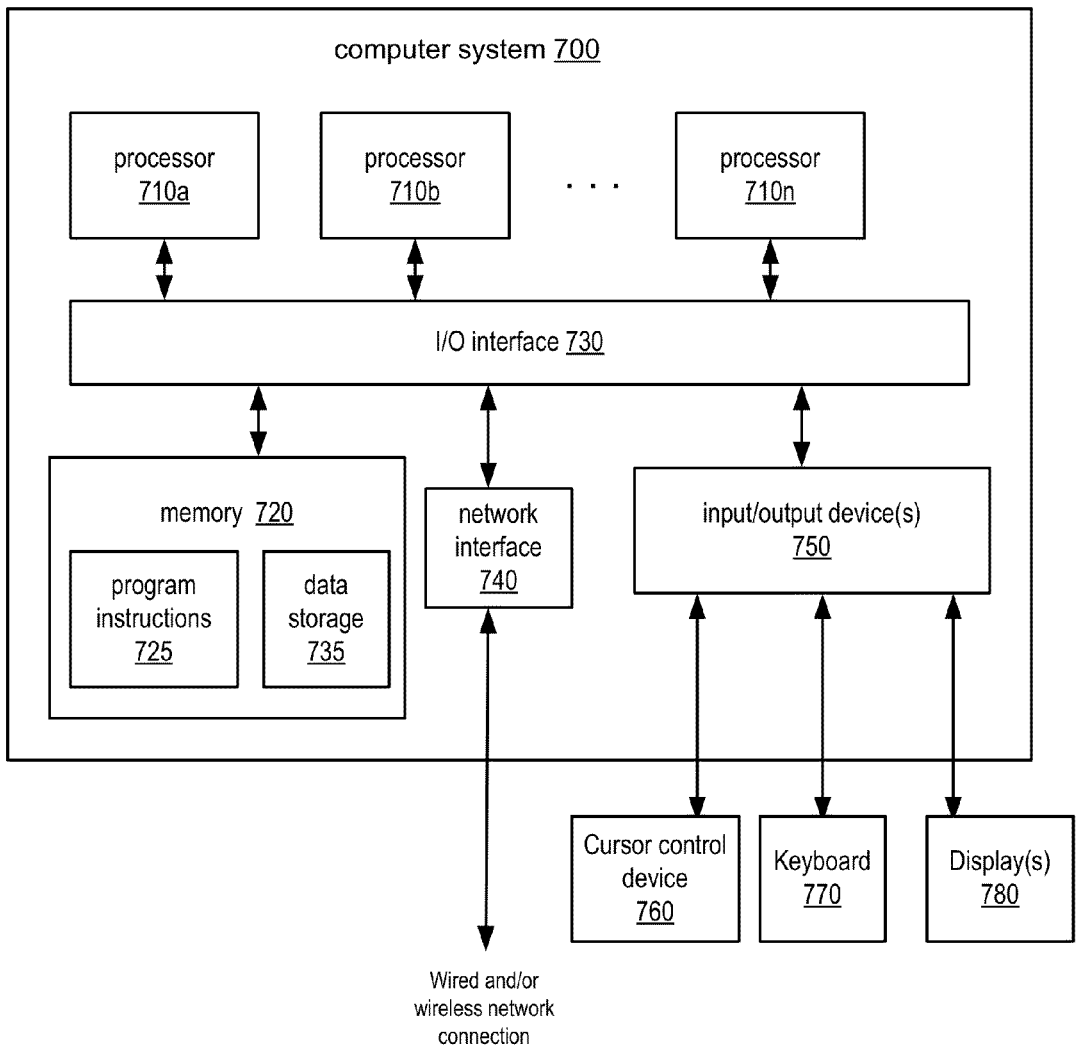
FIG. 37 illustrates an example of a computer system that may be used in embodiments.

Various components of embodiments of the methods for modeling 3D surfaces from curves as described herein may be executed on one or more computer systems, which may interact with various other devices. One such computer system is illustrated by FIG. 37. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for surface inflation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as the methods for modeling 3D surfaces from curves as described herein, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 37, memory 720 may include program instructions 725, configured to implement embodiments of the methods for modeling 3D surfaces from curves as described herein, and data storage 735, comprising various data accessible by program instructions 725. In one embodiment, program instructions 725 may include software elements of the methods for modeling 3D surfaces from curves as illustrated in the above Figures. Data storage 735 may include data that may be used in embodiments. In other embodiments, other or different software elements and data may be included.

Those skilled in the art will appreciate that computer system 700 is merely illustrative and is not intended to limit the scope of the methods for modeling 3D surfaces from curves as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
   obtaining a reference three-dimensional (3D) shape;
   receiving input specifying a constraint curve drawn on a surface of the reference 3D shape;
   automatically closing the constraint curve by connecting endpoints of the constraint curve with a line segment if the constraint curve is open;
   generating an N-sided patch from the specified constraint curve and the reference 3D shape, the generating comprising solving a linear system of equations constructed using one or more vertices that are not part of a mesh describing the reference 3D shape; and
   displaying the generated N-sided patch.

2. The computer-implemented method as recited in claim 1, further comprising:
   generating a smooth 3D surface from the generated N-sided patch and the portion of the reference 3D shape enclosed by the specified constraint curve; and
   displaying the generated 3D surface.

3. The computer-implemented method as recited in claim 1, wherein 3D positions and surface normals of the reference 3D shape at points on the specified constraint curve are used as boundary conditions to generate the N-sided patch.

4. The computer-implemented method as recited in claim 1, further comprising, after said receiving input specifying a constraint curve drawn on the surface of the reference 3D shape and prior to said generating an N-sided patch from the specified constraint curve and the reference 3D shape:
   receiving input replacing the reference 3D shape with a different 3D shape; and
   receiving input specifying an additional portion of the constraint curve drawn on a surface of the different 3D shape;
   wherein said generating an N-sided patch from the specified constraint curve and the reference 3D shape comprises generating the N-sided patch from the specified constraint curve and respective portions of the reference 3D shape and the different 3D shape.

5. The computer-implemented method as recited in claim 1, wherein said receiving input specifying a constraint curve drawn on a surface of the reference 3D shape comprises receiving input drawing the constraint curve on the surface of the 3D shape, wherein, for each point drawn on the surface, a surface normal and a 3D position are determined from the reference 3D shape and stored; and
   wherein said generating an N-sided patch from the specified constraint curve and the reference 3D shape comprises generating the boundary conditions of the N-sided patch according to the stored surface normals and 3D positions.

6. The computer-implemented method as recited in claim 1, further comprising discarding the reference 3D shape after said generating the N-sided patch from the specified constraint curve and the reference 3D shape.

7. A system, comprising:
   at least one processor;
   a display device; and
   a memory comprising program instructions stored thereon that, responsive to execution by the at least one processor, implement a 3D modeling tool, the 3D modeling tool configured to perform operations comprising:
      obtaining a reference three-dimensional (3D) shape;
      receiving input specifying a constraint curve drawn on a surface of the reference 3D shape;
      automatically closing the constraint curve using a line segment if the constraint curve is open;
      generating an N-sided patch from the specified constraint curve and the reference 3D shape, the generating comprising solving an over-constrained system of equations; and
      displaying the generated N-sided patch to the display device.

8. The system as recited in claim 7, wherein the 3D modeling tool is further configured to perform operations comprising:
   generating a smooth 3D surface from the generated N-sided patch and the portion of the reference 3D shape enclosed by the specified constraint curve; and
   displaying the generated 3D surface.

9. The system as recited in claim 7, wherein 3D positions and surface normals of the reference 3D shape at points on the specified constraint curve are used as boundary conditions to generate the N-sided patch.

10. The system as recited in claim 7, wherein the 3D modeling tool is configured to perform operations further comprising, after said receiving input specifying a constraint curve drawn on the surface of the reference 3D shape and prior to said generating an N-sided patch from the specified constraint curve and the reference 3D shape:
    receiving input replacing the reference 3D shape with a different 3D shape; and
    receiving input specifying an additional portion of the constraint curve drawn on a surface of the different 3D shape;
    wherein the 3D modeling tool is further configured to generate an N-sided patch from the specified constraint curve and the reference 3D shape by generating the N-sided patch from the specified constraint curve and respective portions of the reference 3D shape and the different 3D shape.

11. The system as recited in claim 7, wherein the 3D modeling tool is configured to receive input specifying a constraint curve drawn on a surface of the reference 3D shape by receiving input drawing the constraint curve on the surface of the 3D shape, wherein, for each point drawn on the surface, a surface normal and a 3D position are determined from the reference 3D shape and stored; and
    wherein the 3D modeling tool is configured to generate an N-sided patch from the specified constraint curve and the reference 3D shape by generating the boundary conditions of the N-sided patch according to the stored surface normals and 3D positions.

12. The system as recited in claim 7, wherein the 3D modeling tool is further configured to discard the reference 3D shape after said generating an N-sided patch from the specified constraint curve and the reference 3D shape.

13. A computer-readable storage device comprising program instructions stored thereon that, responsive to execution by a computer cause the computer to perform operations comprising:
- obtaining a reference three-dimensional (3D) shape;
- receiving input specifying a constraint curve drawn on a surface of the reference 3D shape;
- automatically closing the constraint curve by connecting endpoints of the constraint curve if the constraint curve is open;
- receiving input specifying a force and a direction of the force;
- generating an N-sided patch from the specified constraint curve and the reference 3D shape, the generating comprising solving a system of equations incorporating the force and the direction of the force; and
- displaying the generated N-sided patch.

14. The computer-readable storage device as recited in claim 13, wherein the program instructions, responsive to execution by the computer, cause the computer to perform operations further comprising:
- generating a smooth 3D surface from the generated N-sided patch and the portion of the reference 3D shape enclosed by the specified constraint curve; and
- displaying the generated 3D surface.

15. The computer-readable storage device as recited in claim 13, wherein 3D positions and surface normals of the reference 3D shape at points on the specified constraint curve are used as boundary conditions to generate the N-sided patch.

16. The computer-readable storage device as recited in claim 13, wherein the program instructions, responsive to execution by the computer, cause the computer to perform operations further comprising, after said receiving input specifying a constraint curve drawn on the surface of the reference 3D shape and prior to said generating an N-sided patch from the specified constraint curve and the reference 3D shape:
- receiving input replacing the reference 3D shape with a different 3D shape; and
- receiving input specifying an additional portion of the constraint curve drawn on a surface of the different 3D shape;
- wherein said generating an N-sided patch from the specified constraint curve and the reference 3D shape comprises generating the N-sided patch from the specified constraint curve and respective portions of the reference 3D shape and the different 3D shape.

17. The computer-readable storage device as recited in claim 13, wherein the program instructions, responsive to execution by the computer, cause the computer to receive input specifying a constraint curve drawn on a surface of the reference 3D shape by receiving input drawing the constraint curve on the surface of the 3D shape, wherein, for each point drawn on the surface, a surface normal and a 3D position are determined from the reference 3D shape and stored; and
- wherein, the program instructions, responsive to execution by the computer, cause the computer to generate an N-sided patch from the specified constraint curve and the reference 3D shape by generating the boundary conditions of the N-sided patch according to the stored surface normals and 3D positions.

18. A computer-implemented method, comprising:
- obtaining a reference three-dimensional (3D) shape;
- receiving input specifying a constraint curve drawn on a surface of the reference 3D shape;
- receiving input replacing the reference 3D shape with a different 3D shape;
- receiving input specifying an additional portion of the constraint curve drawn on a surface of the different 3D shape;
- generating an N-sided patch from the specified constraint curve and respective portions of the reference 3D shape and the different 3D shape, the generating comprising solving a linear system of equations constructed using one or more vertices that are not part of a mesh describing the reference 3D shape or the different 3D shape; and
- displaying the generated N-sided patch.

19. The computer-implemented method as recited in claim 18, further comprising:
- generating a smooth 3D surface from the generated N-sided patch and the portion of the reference 3D shape enclosed by the specified constraint curve; and
- displaying the generated 3D surface.

20. The computer-implemented method as recited in claim 18, wherein 3D positions and surface normals of the reference 3D shape at points on the specified constraint curve are used as boundary conditions to generate the N-sided patch.

* * * * *